Jan. 28, 1941.     C. M. F. FRIDEN     2,229,889
CALCULATING MACHINE
Filed May 8, 1934     12 Sheets-Sheet 1
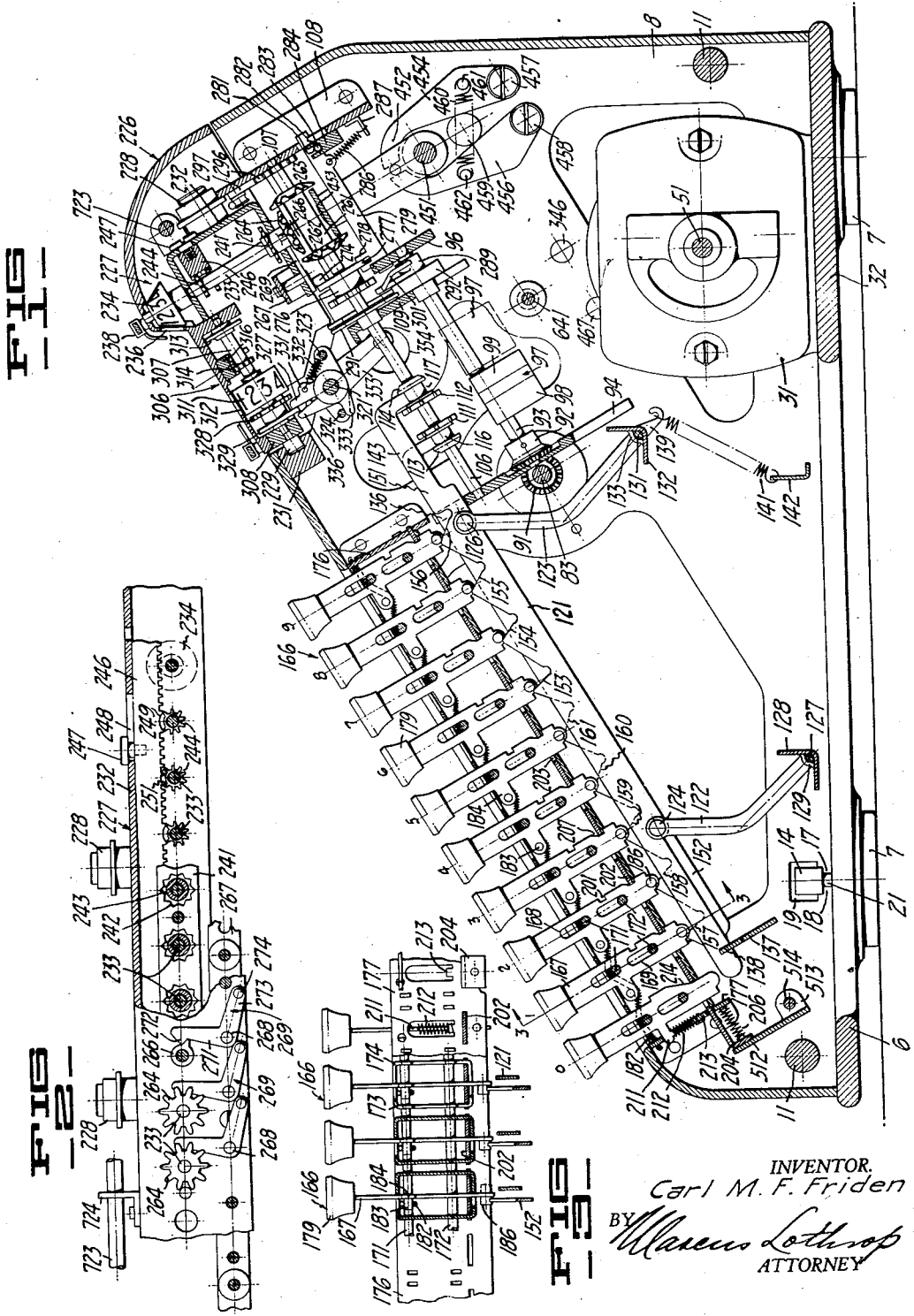
INVENTOR.
Carl M. F. Friden
BY
ATTORNEY

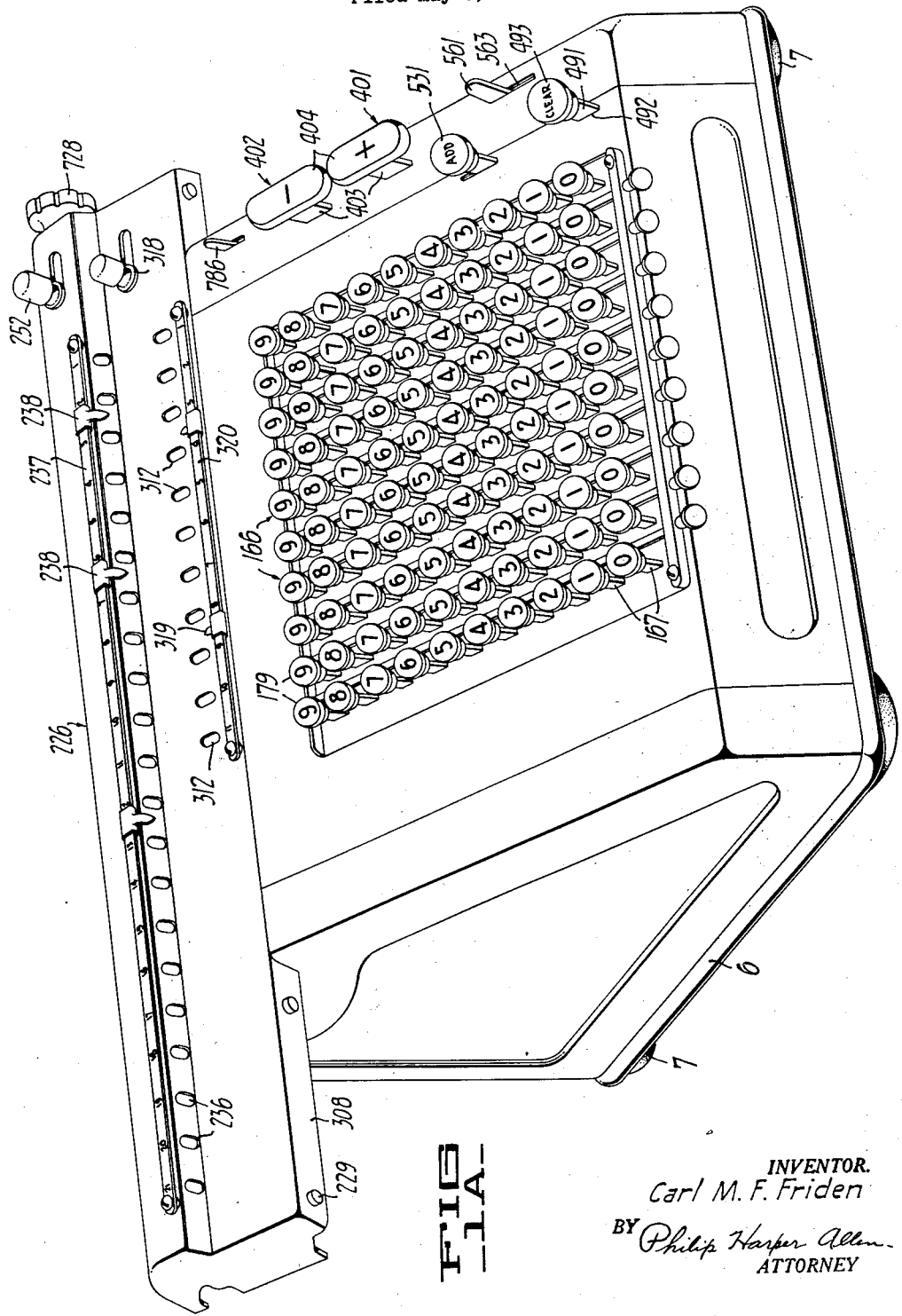

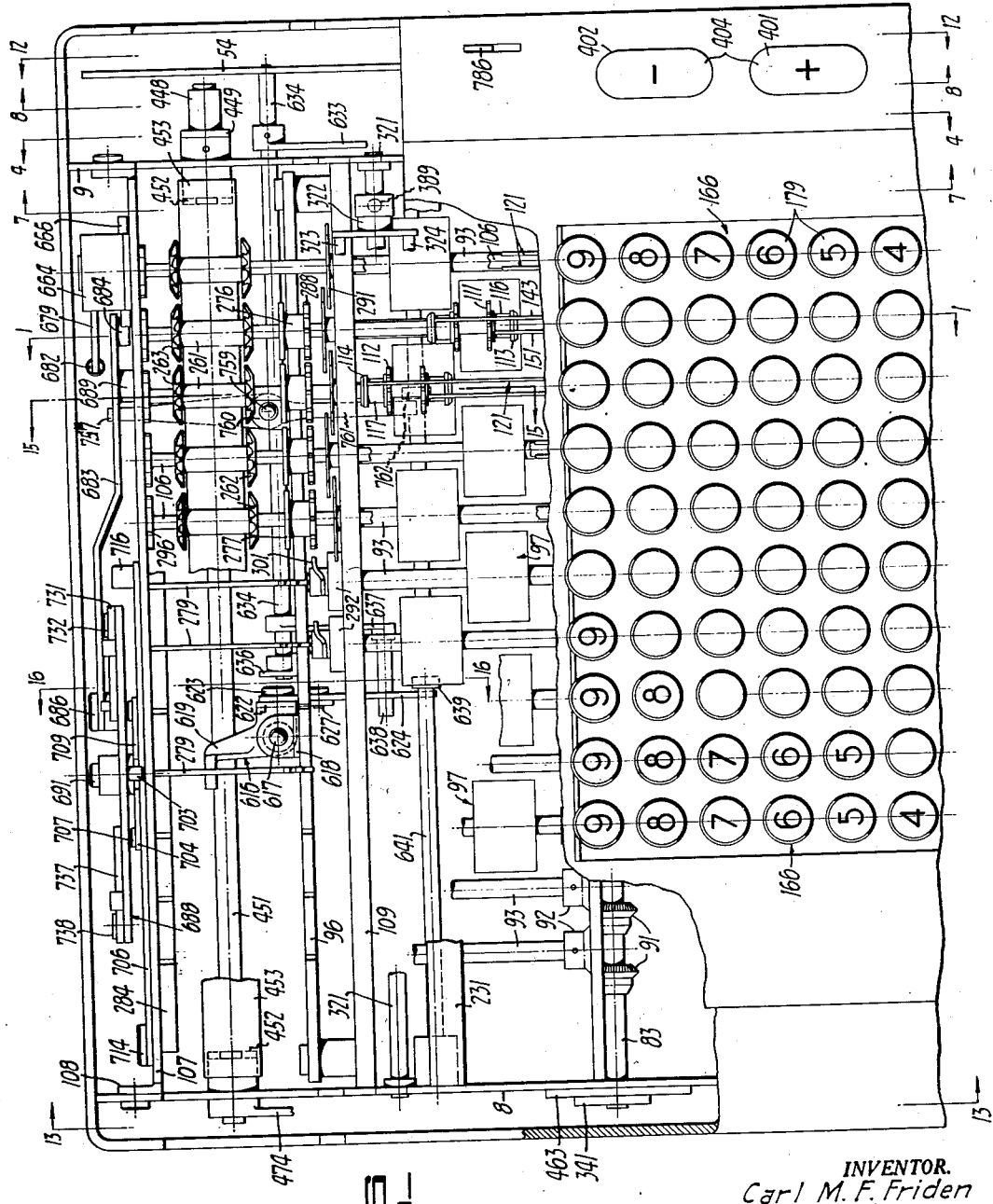

Jan. 28, 1941.                C. M. F. FRIDEN                  2,229,889
                           CALCULATING MACHINE
                          Filed May 8, 1934           12 Sheets-Sheet 4

INVENTOR.
Carl M. F. Friden
BY Philip Harper Allen
ATTORNEY

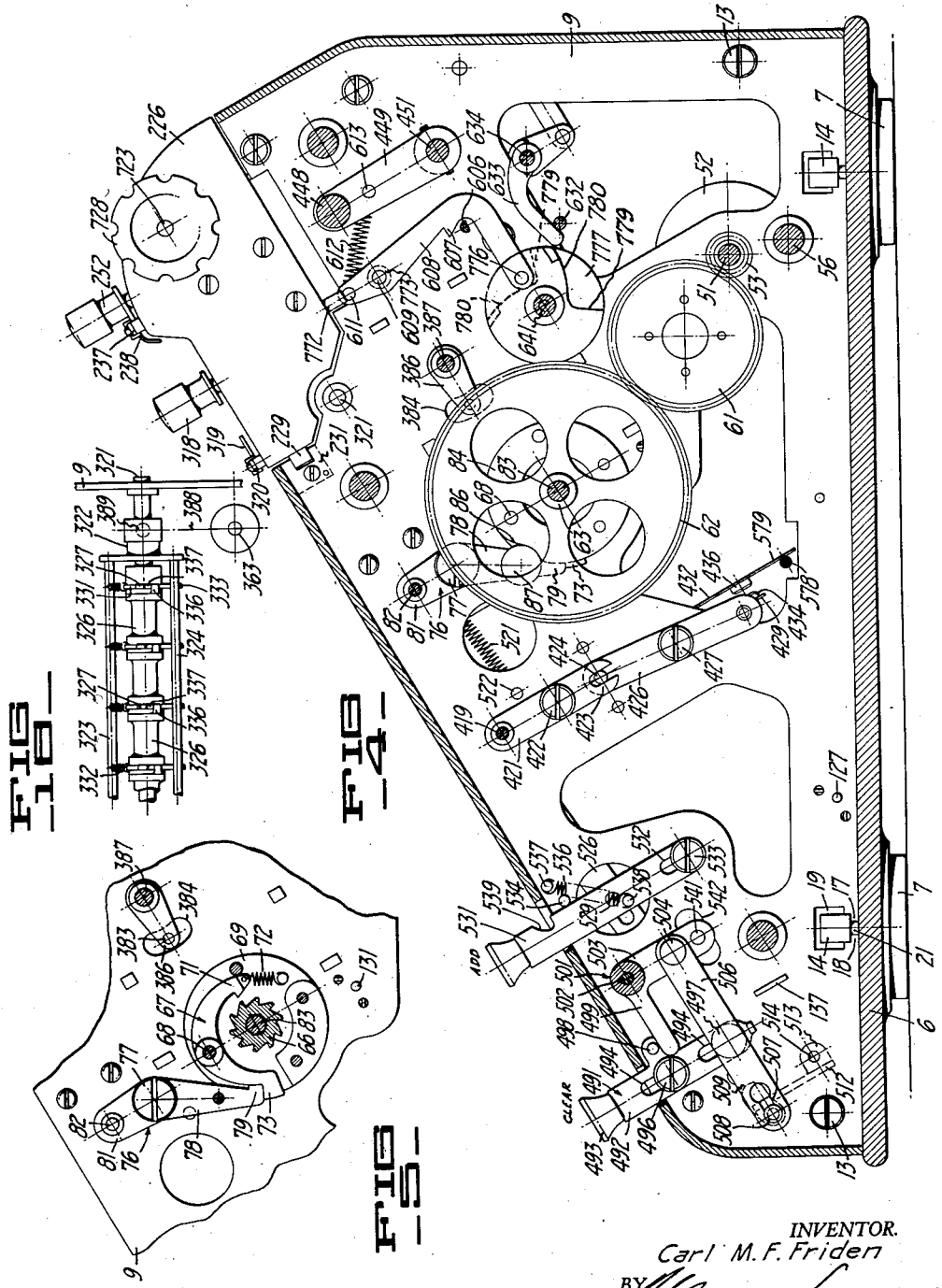

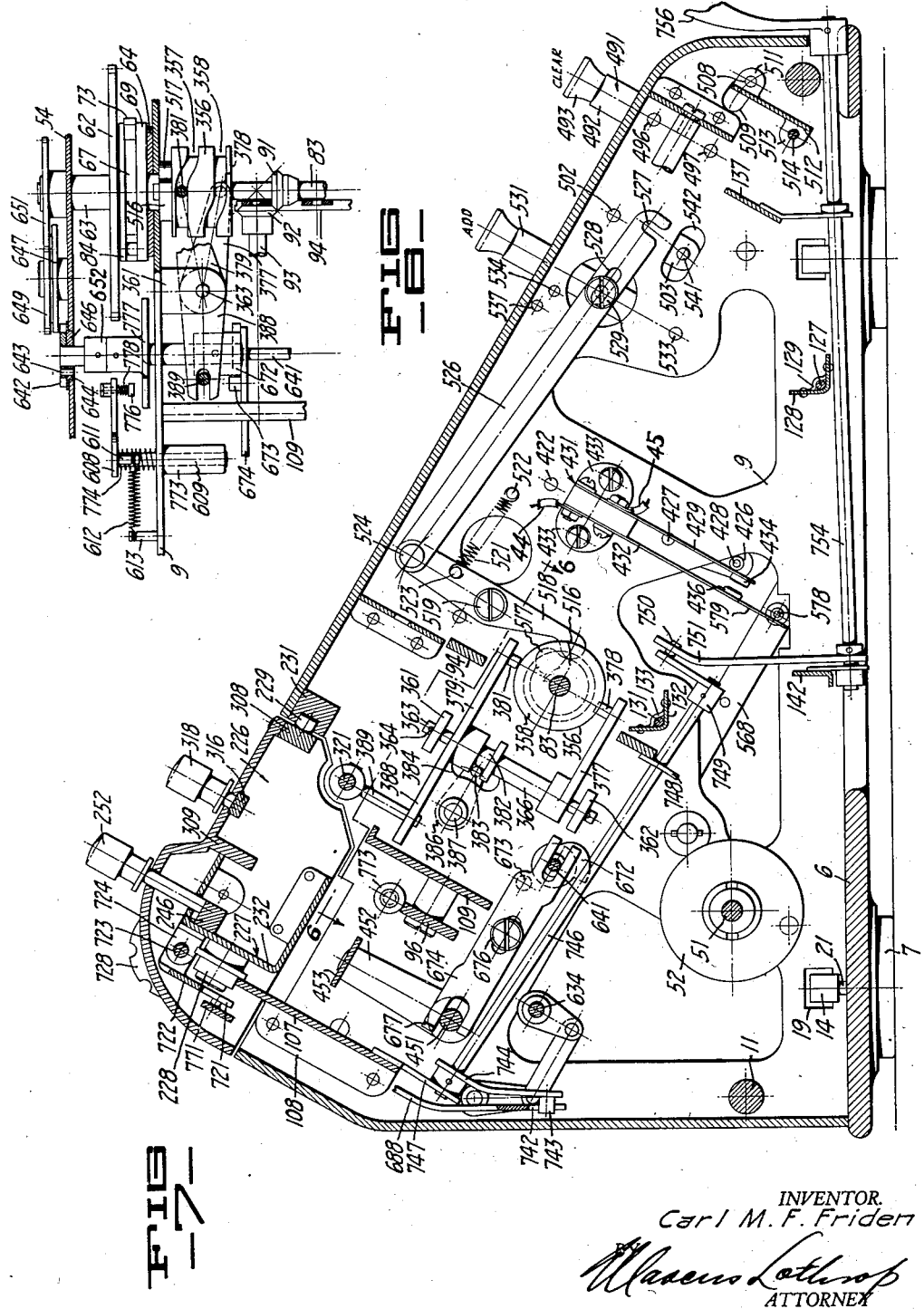

Jan. 28, 1941.　　C. M. F. FRIDEN　　2,229,889
CALCULATING MACHINE
Filed May 8, 1934　　12 Sheets-Sheet 7
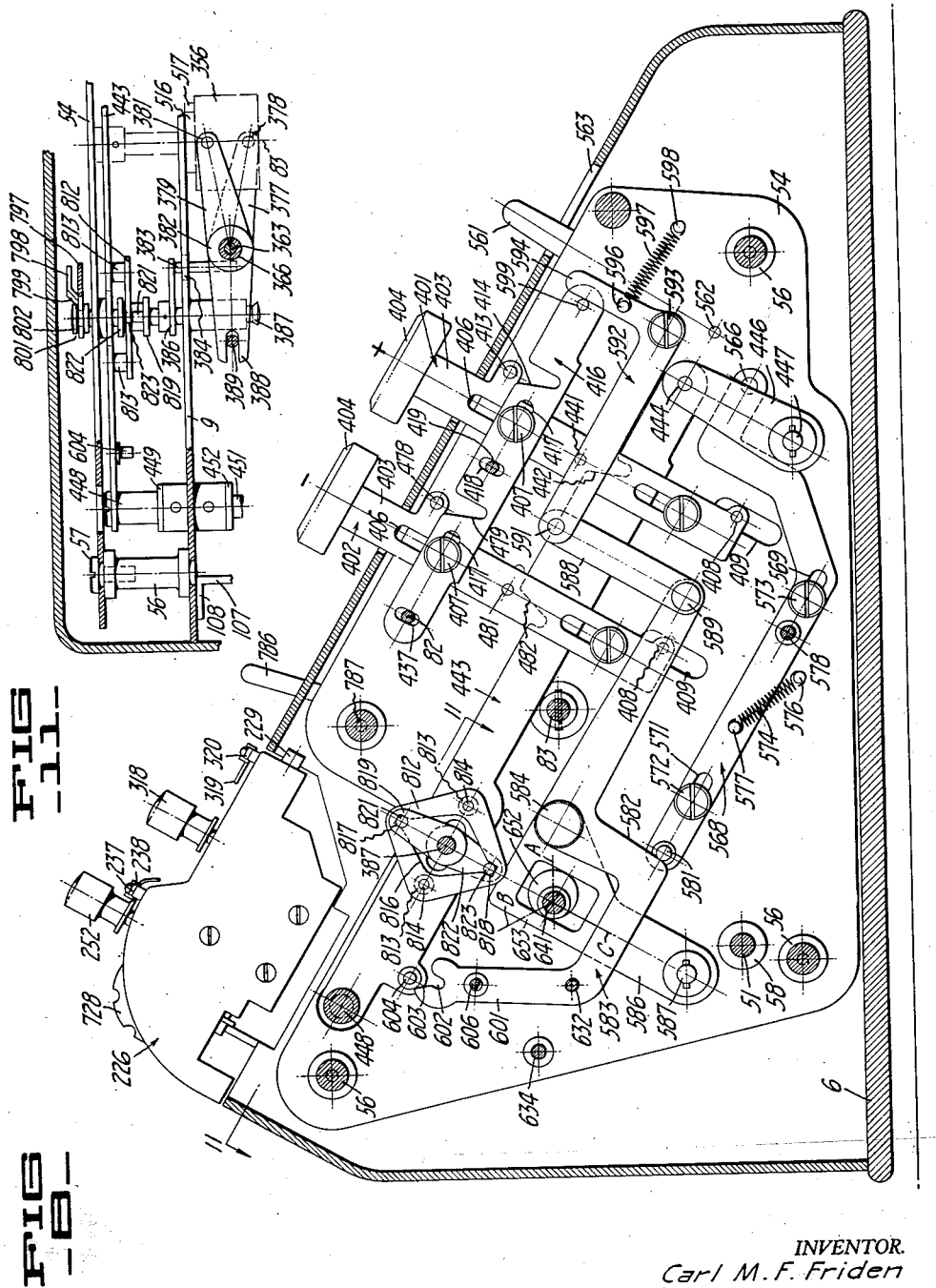
INVENTOR.
Carl M. F. Friden
ATTORNEY

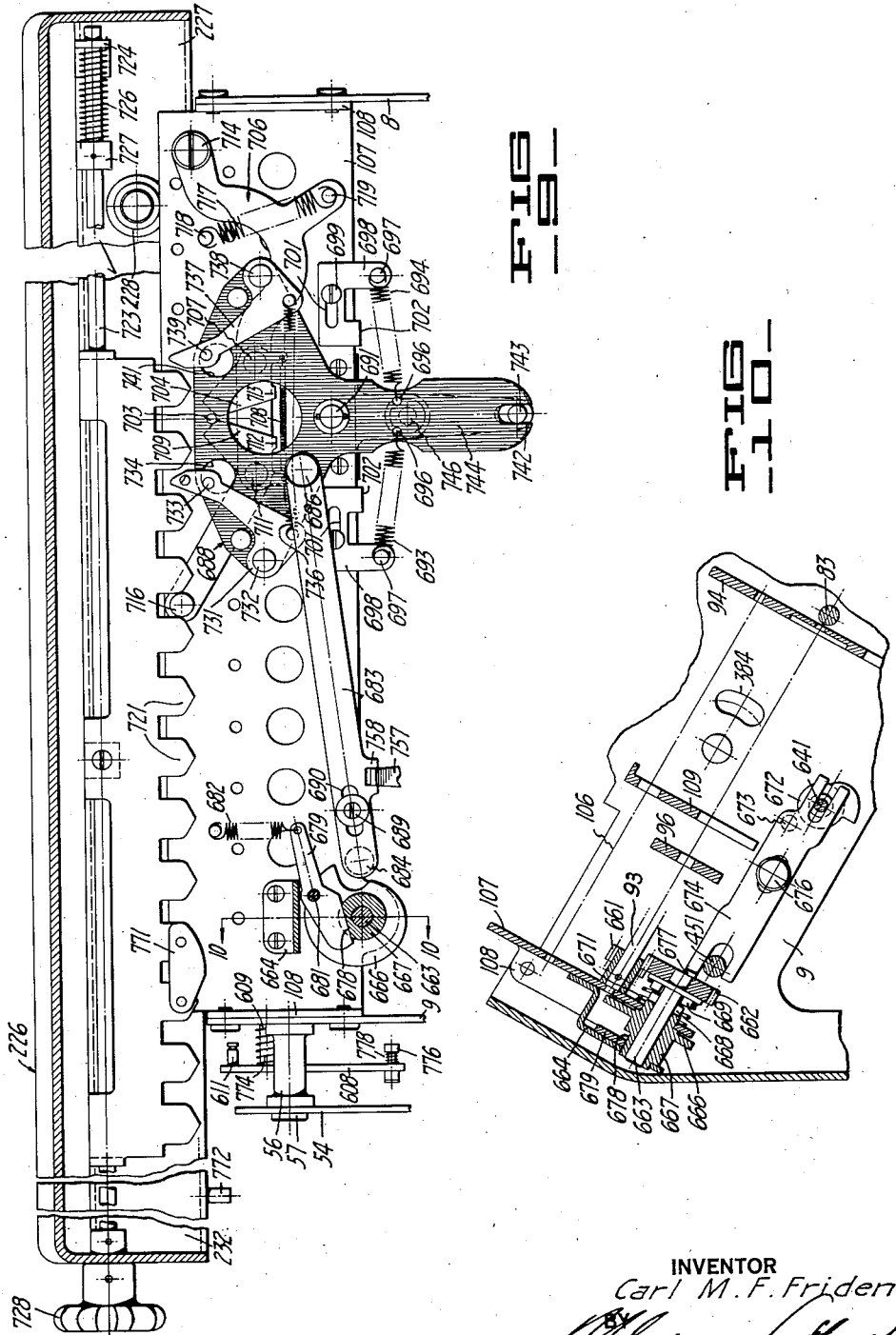

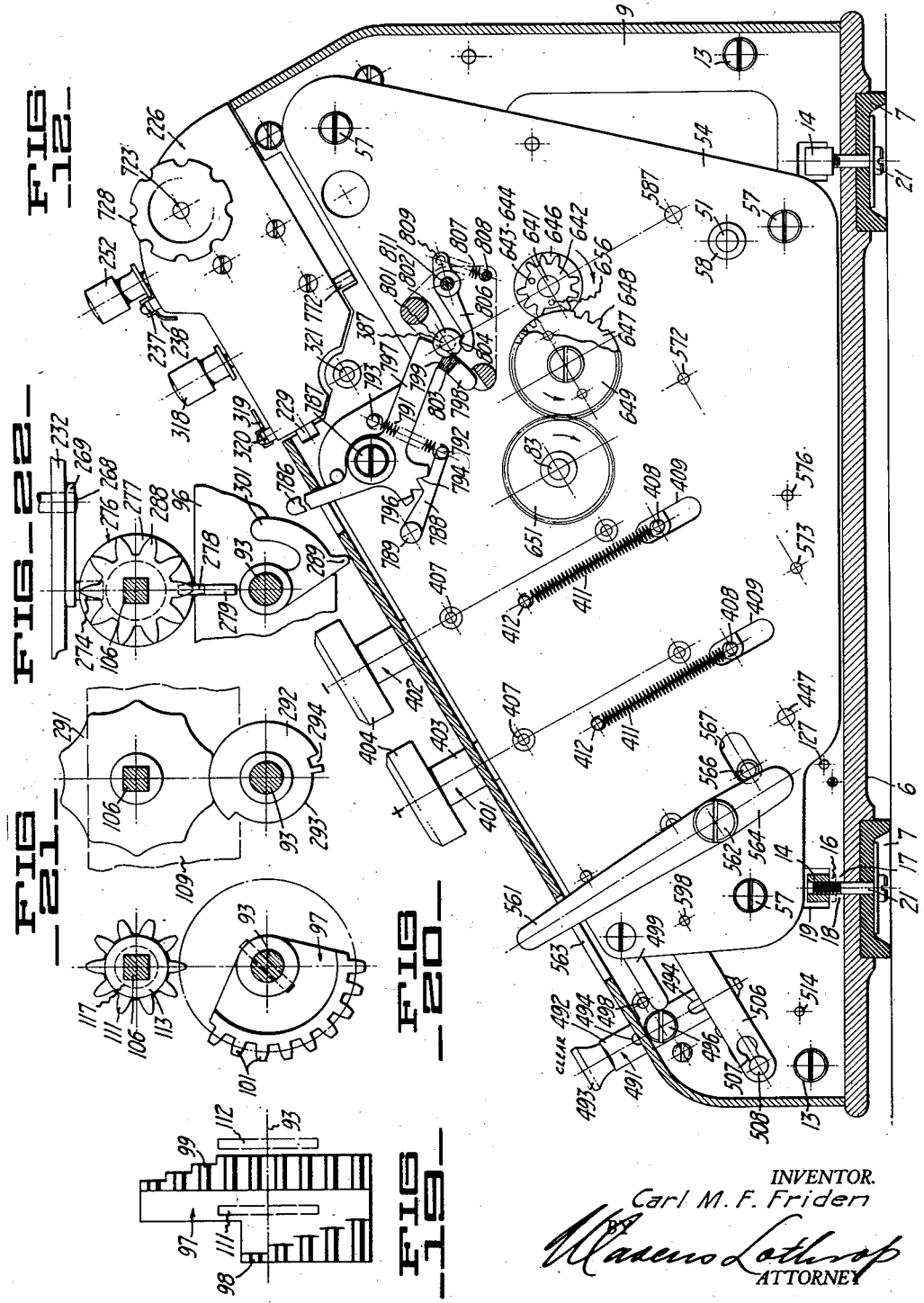

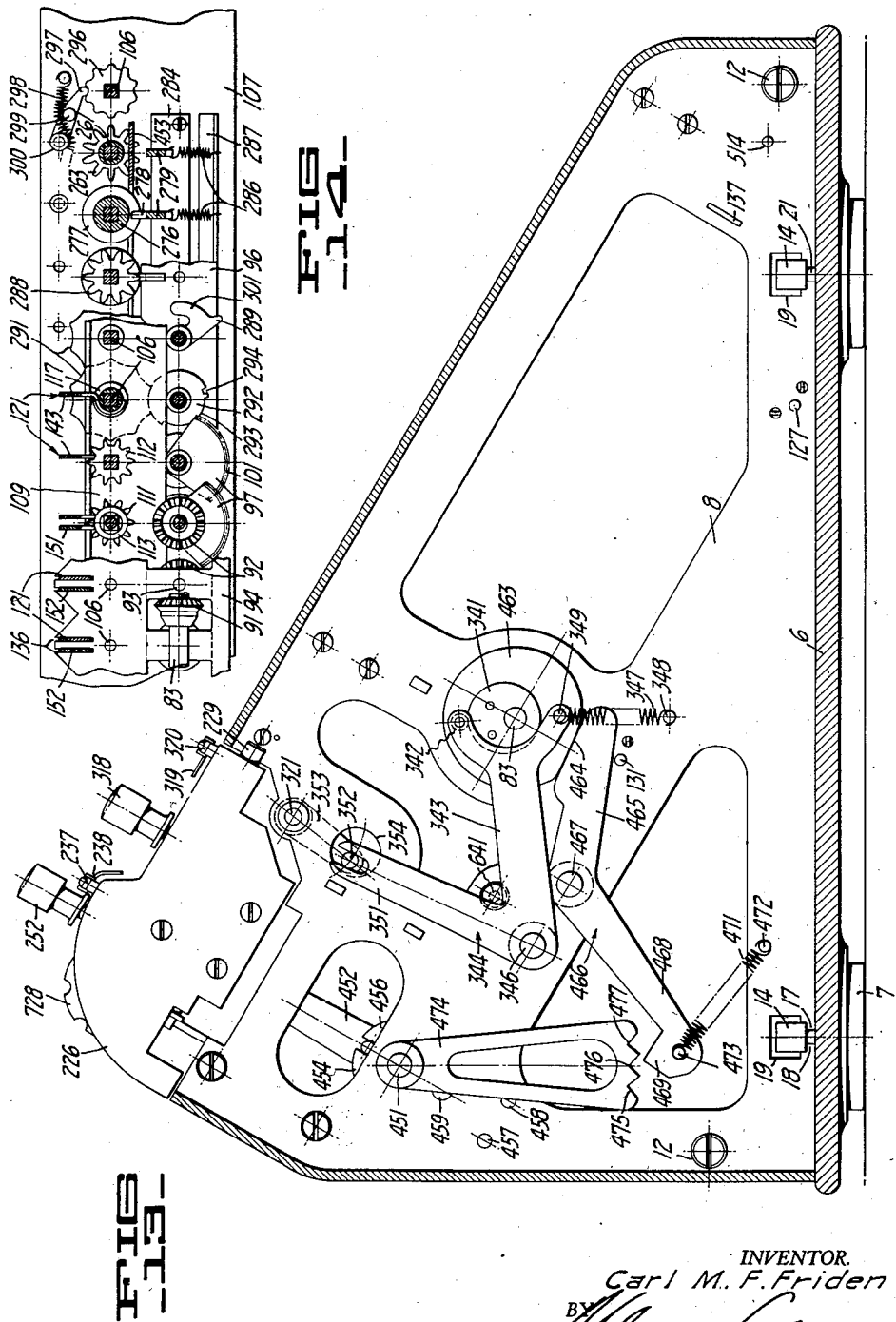

Jan. 28, 1941.          C. M. F. FRIDEN            2,229,889
                     CALCULATING MACHINE
                    Filed May 8, 1934       12 Sheets-Sheet 11

INVENTOR
Carl M. F. Friden

ATTORNEY

Jan. 28, 1941.  C. M. F. FRIDEN  2,229,889
CALCULATING MACHINE
Filed May 8, 1934   12 Sheets-Sheet 12

INVENTOR.
Carl M. F. Friden
BY
ATTORNEY

Patented Jan. 28, 1941

2,229,889

UNITED STATES PATENT OFFICE 2,229,889

CALCULATING MACHINE

Carl M. F. Friden, Orinda, Calif., assignor to Friden Calculating Machine Co. Inc., Oakland, Calif., a corporation of California Application May 8 1934, Serial No. 724,482

4 Claims. (Cl. 235—62)

My invention relates to calculating machines and is especialy concerned with a machine for effecting the four rules of calculation.

The object of my invention is, in general, to provide an improved calculating machine.

Another object of my invention is to provide an improved calculating machine of the type having a reversible accumulator and uni-directionally operable actuating means.

A further object of my invention is to provide improved division mechanism for a calculating machine, which consumes a minimum time for performing a division operation.

A further object of my invention is to provide improved division mechanism for a calculating machine, which employs a programmed operation control and in which the cyclically operable drive mechanism operates continuously without stopping from the beginning to the end of a division operation.

Another object of my invention is to provide in a calculating machine of the type having reversible numeral wheels and uni-directionally operable actuating means therefor, improved mechanism for performing division operations.

Another object of my invention is to provide in a calculating machine of the type having reversible numeral wheels and uni-directionally operable actuating means therefor, improved mechanism for controlling the sign character of the registration on the numeral wheels.

A further object of my invention is to provide improved actuator means for the revolutions counter of a calculating machine.

The foregoing and other objects are attained in the embodiment of the invention shown in the drawings, in which—

Figure 1 is a longitudinal sectional view through one order of the calculating machine as indicated by the line 1—1 in Fig. 1B, illustrating the relation of the keyboard to the accumulator and its actuating mechanism, as well as the revolutions counter and its actuator. Certain of the parts are shown in elevation.

Figure 1A is a perspective elevational view of the calculating machine.

Figure 1B is a plan view of the rear portion of the machine with the shiftable carriage removed and with certain parts broken away and others shown in outline to obtain clearness.

Figure 2 is a bottom plan view partially in section of the accumulator carriage, with the central part of the view broken away to a level immediately below the numeral wheel centralizing strip 241, and with the right hand portion of the view broken away to a level immediately below the zero-resetting rack 246.

Figure 3 is a fragmentary cross-sectional view thru the keyboard with the right-hand portion taken immediately in front of cross plate 177, the central portion taken in the plane of the line 3—3 in Fig. 1, and the left-hand portion of the view is broken away to the rear plate 176 to show its construction. Certain parts shown in section and others omitted to illustrate various details of construction of the keyboard.

Figure 4 is an elevational section taken longitudinally and vertically of the machine as indicated by the line 4—4 in Fig. 1B.

Figure 5 is a fragmentary view similar to Fig. 4, but with gear 62 and disc 84 removed to illustrate the clutch construction.

Figure 6 is a plan view, partially in section, of the main drive train and clutch of the machine, the view being indicated by the line 6—6 in Fig. 7.

Figure 7 is an elevational section taken longitudinally and vertically of the machine as indicated by the line 7—7 in Fig. 1B.

Figure 8 is an elevational section taken longitudinally and vertically of the machine as indicated by the line 8—8 in Fig. 1B, and showing the major control keys and their associated mechanisms.

Figure 9 is a rear elevational view, partly in section, of the upper part of the machine, showing the carriage shifting mechanism.

Figure 10 is a vertical cross-sectional view of a part of the carriage shifting mechanism taken in a plane indicated by the line 10—10 in Fig. 9.

Figure 11 is a horizontal cross-sectional view of a portion of the machine as indicated by the line 11—11 in Fig. 8.

Figure 12 is a sectional elevation of the machine on a vertical longitudinal plane indicated by the line 12—12 in Fig. 1B.

Figure 13 is a sectional elevation of the machine on a vertical longitudinal plane indicated by the line 13—13 in Fig. 1B.

Figure 14 is a sectional elevation looking toward the rear of the machine with portions broken away in successive steps from left to right in each order shown.

Figure 15:
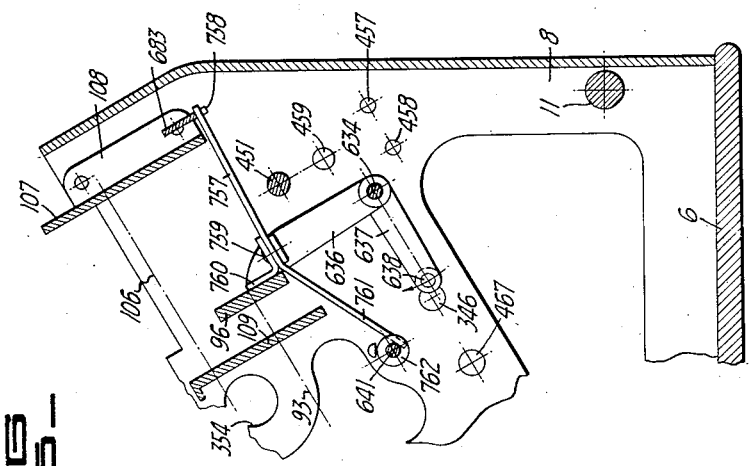

Figure 15 is a fragmentary view showing in longitudinal vertical section part of the carriage shifting mechanism as indicated by the line 15—15 in Fig. 1B.

Figure 16:
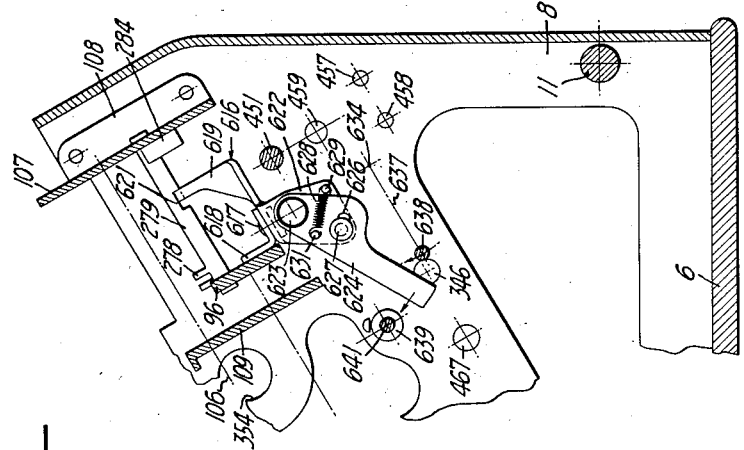

Figure 16 is a fragmentary view showing in longitudinal vertical section the overdraft control mechanism effective in automatic division, the plane of the view being indicated by the line 16—16 in Fig. 1B.

Figure 17:
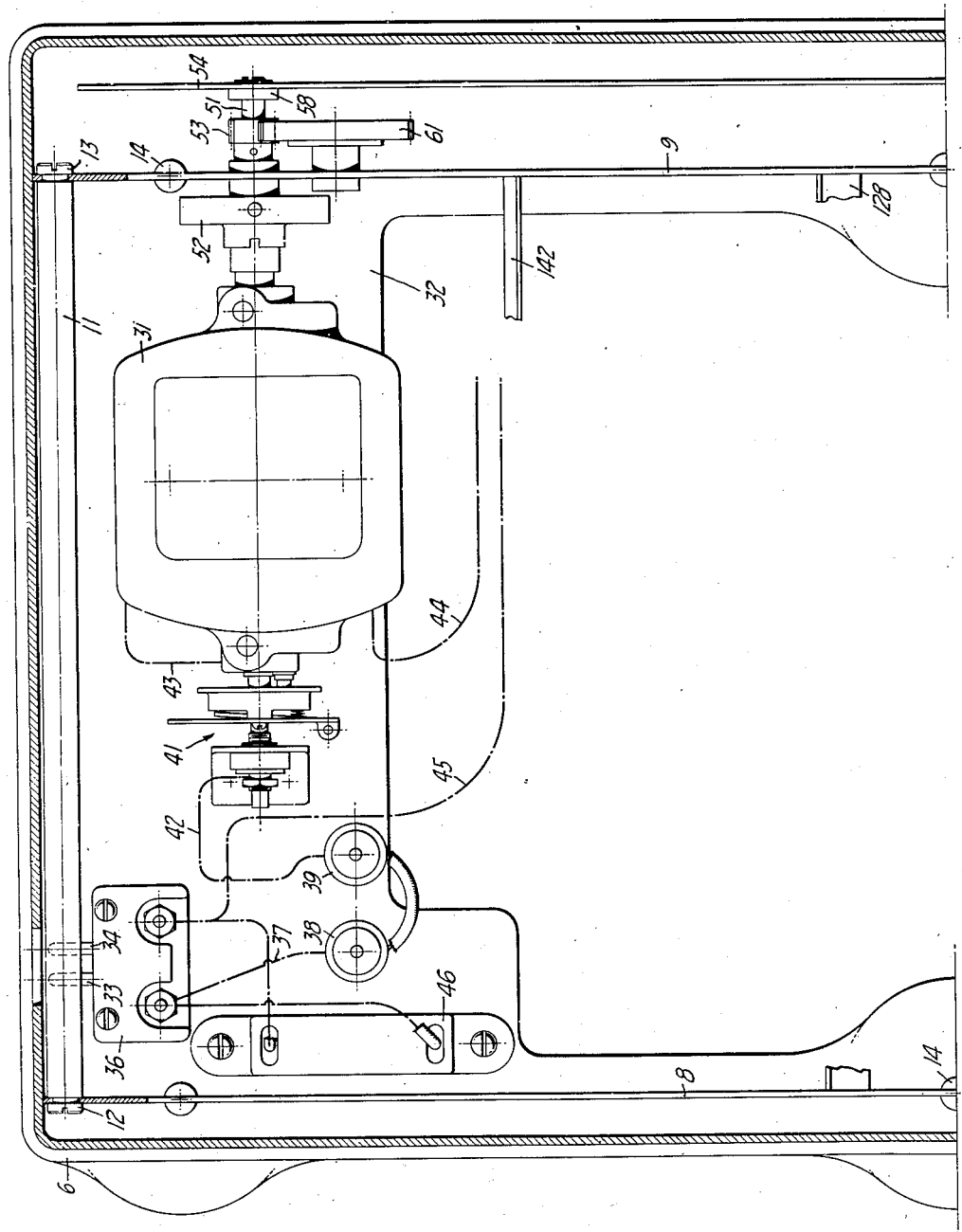

Figure 17 is a sectional plan view of the base of the machine, showing the driving motor and its connections.

Figure 1C:
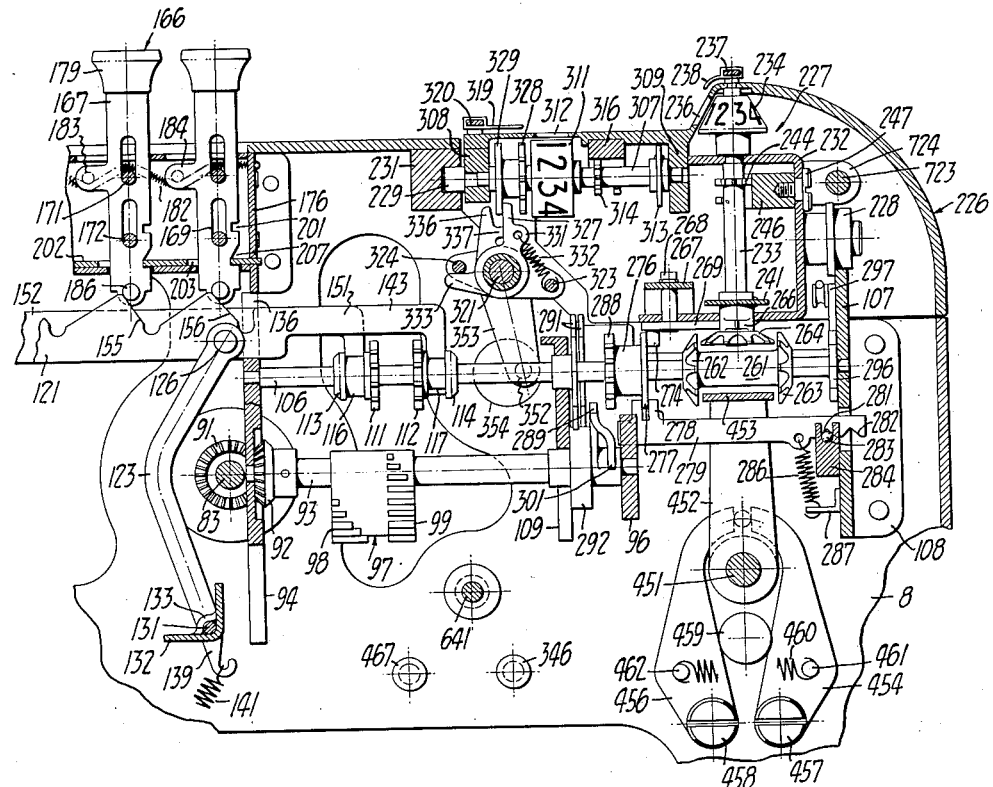
Figure 1C is an enlarged sectional view corresponding to the rear portion of Fig. 1.

Figure 18 is a plan view of the actuator for the revolutions counter, which is shown operatively related thereto in Figs. 1 and 1C.

Figure 19 is a developed view of a segmental actuating gear 97 for the accumulator, also illustrated in Figs. 1, 1C, and 20.

Figure 20 is an end elevational view, partly in section of one of the segmental actuating gears 97 together with one of the associated gears selectively driven thereby as shown in Figs. 1, 1C, and 14.

Figure 21 is an end elevational view, partly in section, of one of the Geneva gear overthrow preventing mechanisms associated with each order of the machine, as shown in Figs. 1, 1C, and 14.

Figure 22 is an elevational view, partly in section, of a part of the tens carrying mechanism for the accumulator as shown in Figs. 1, 1C and 14.

Figures 23, 24:
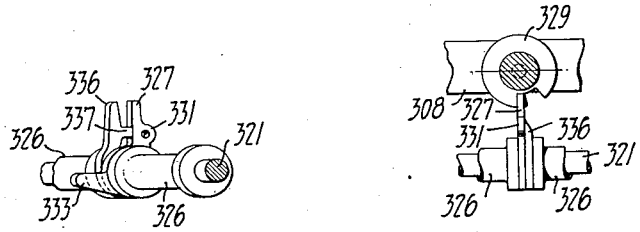

Figure 23 is a fragmentary perspective view of the revolutions counter actuator also shown in Figs. 1, 1C and 18.

Figure 24 is a transverse sectional elevation of a part of the revolutions counter actuator, and the tens carrying disc associated therewith, as also shown in Figs. 1 and 1C.

Frame

My calculating machine includes a base 6, (Figs. 1, 12, 13 and 17) which conveniently is a metal plate having four feet 7 of shock and sound absorbent material mounted thereon for supporting the base. Arranged with their planes longitudinally of the machine and at opposite sides of the base plate 6 are frame plates 8 and 9 which are joined together at suitable intervals by through-rods 11 abutting the plates 8 and 9 and secured thereto by suitable fastening screws 12 and 13. The plates 8 and 9 are also detachably secured to the base plate 6 by circular nuts 14 each having a diametral slot 16 cut therein for overlying the lower margins 17 and 18 of a generally rectangular aperture 19 cut in the appropriate end plate. Engaged with the nut 14 is a through-bolt 21 passing through the base plate 6.

Drive mechanism

Likewise mounted on the base plate 6 is a source of power such as an electric motor 31 (Figs. 1 and 17) which is suitably fastened to a pad 32 forming part of the base plate. The motor is supplied with electricity from any suitable source which is connected to the machine at terminals 33 and 34 (Fig. 17) which are of standard construction. The terminals project from a terminal block 36 fastened to the base 6 and to which are likewise fastened a lead-in wire 37 passing to a pair of resistors 38 and 39 mounted on the base, from whence the current flows to a standard centrifugally-actuated speed governing switch 41 through a conductor 42. From the switch 41 the circuit leads to the motor through a conductor 43, and thence to the main contacts of the machine, referred to hereinafter, through a lead 44. From such contacts the circuit leads back through a conductor 45 to the terminal block 36. A condenser 46 is connected across the lines 37 and 45 to reduce surges therein.

The drive from the motor is from the motor shaft 51, (Fig. 17) through a suitable coupling device 52 to a pinion 53 which is mounted between the frame plate 9 and a control plate 54 suitably attached to the frame plate 9 by spacers 56 (Figs. 11 and 12) and screws 57. The motor shaft 51 (Fig. 17) is extended and is journaled, as at 58, in the control plate 54. The pinion 53 (Figs. 4 and 17) has ten teeth and meshes with an idler gear 61 suitably journaled in the frame plate 9. The idler gear 61 (Fig. 4) in turn meshes with a sixty-tooth gear 62 mounted fixedly on a sleeve 63 (Figs. 4 and 6) journaled in the control plate 54 and likewise in the frame plate 9 which at this point is provided with a reinforcing washer 64.

Clutch mechanism

Connected to revolve with the gear 62 is a ratchet 66 (Fig. 5) forming part of the main clutch mechanism, which provides the only drive from the motor to operating parts of the calculating machine. Arranged in the same plane as the ratchet 66 is a lever 67 (Figs. 4, 5 and 6) centrally pivoted as at 68 on an adjacent driven disc 69 which is mounted on main shaft 83. One end of the lever 67 is provided with a nose 71 which is urged into engagement with the ratchet 66 by a coil spring 72 fastened to the plate 69. The other end of the lever 67 projects radially, as at 73, from the periphery of the disc 69 under the urgency of the spring 72.

To hold the clutch out of engagement, the nose 71 (Fig. 5) must be held away from the ratchet 66 against the urgency of the spring 72, and for that purpose I provide a lever 76 (Figs. 4 and 5) pivoted as at 77 on the frame plate 9. One arm 78 of the lever 76 is provided with a tooth 79 which is co-planar with and normally in the path of the projection 73. The other arm 81 of the lever 76 is provided with a pin 82 for controlling the rotary position of the lever 76. Thus, when the lever 76 is rotated clockwise, as seen in Figs. 4 and 5, the tooth 79 is drawn out of the path of the projection 73 and the spring 72 is effective to cause engagement of the pawl 71 with the ratchet 66, thus coupling the gear 62 with a main shaft 83 extending transversely of the machine between the frame plates 8 and 9 and journaled therein.

In order that the lever 76 will be held in clutch-engaged position for a complete rotation of the shaft 83, there is arranged a disc 84 (Fig. 4) comparable to the disc 69 but having an interruption or irregularity 86 in its peripheral continuity, which is adapted to co-operate with a button 87 mounted on the lever 76. The relationship of these parts is illustrated in Fig. 4, with the clutch in disengaged position and the button 87 within the irregularity 86. This is the "full-cycle" position of the parts. As soon, however, as the lever 76 has been rocked clockwise to cause engagement of the clutch, and as soon as an initial rotation has occurred, the disc 84 rides under the button 87 holding the lever 76 in clutch-engaged position at least until such time as the gear 62 and the ratchet 66 have in unison completed a single cycle or single revolution. At the conclusion of such rotation the button 87 is again free to fall into the irregularity 86, to maintain the parts in their relative positions with the clutch disengaged. Thus, when the clutch is in engagement the shaft 83 is rotated by the motor 31.

Actuating and selecting mechanisms

The main shaft 83, at suitable intervals of its length, carries bevel gears 91 (Figs. 1, 1B, 1C and 6) each of which meshes with a comparable bevel gear 92 fastened on its respective actuator shaft 93. The actuator shafts 93 are arranged in parallelism and are journaled in a pair of plates 94 and 96 extending transversely of the machine and in turn mounted in the frame plates 8 and 9. There are as many shafts 93 as there are orders in the particular machine.

Since the actuator shafts and their associated mechanisms are duplicates, but one of them need be described as an illustration. The shaft 93 shown in Figs. 1 and 1C, for instance, in addition to the bevel gear 92 carries an actuator in the form of a segmental gear 97, illustrated in detail in Figs. 19 and 20. The periphery of the segmental gear 97 is provided with two separate series 98 and 99 of teeth 101. There are nine teeth in the complete series 99, the tooth shown at the upper portion of Fig. 19 being the shortest, while the three succeeding teeth are each longer by equal increments, and the remaining five teeth are all of the greatest axial length.

In the series 98 there are but five teeth, the teeth being in line with the teeth in the series 99. However, the uppermost tooth in the series 98 is relatively short, while each of the four remaining teeth is longer than the tooth preceding it by an equal increment. While all of the actuators 97 are alike, they are arranged on their shafts 93 with alternate actuators displaced axially for clearance between successive ones, which are disposed in radial overlapping relation to reduce the width of the machine, furthermore, each of the actuators, as shown particularly in Fig. 14, is polarly displaced on its respective shaft 93 with regard to the remainder of the actuators in the group.

In order that the actuators 97 may be properly effective in the operation of the machine, I provide means to make each of the actuators effective upon an associated shaft 106 (Figs. 1, 1B, 1C and 20) which preferably is of square section except at opposite ends where it is journaled. The shaft 106 is journaled in the plate 94 and likewise in a plate 107 which is at opposite ends turned to provide brackets 108 fastened to the end plates 8 and 9 of the machine. Intermediate its ends the shaft 106 is likewise journaled in a cross wall 109 mounted in the end plates 8 and 9. The shafts 106 are arranged in parallelism, not only with each other but likewise with their respective actuator shafts 93.

For each of the actuators 97 I preferably provide two actuated pinions 111 and 112 (Figs. 1, 1B, 1C, 19 and 20). Each of the pinions is provided with ten teeth cut to mesh with the teeth 101. The pinion 111 is designed to co-operate with the series 98, while the pinion 112 is designed to co-operate with the series 99. To this end the pinions 111 and 112 are axially slidable on the squared shaft 106. In order to control the momentary position of each of these pinions and to translate the pinions along the shaft when desired, I extend each of the pinions to provide a collar 113 and 114, leaving an intermediate groove such as 116 and 117.

The means for moving the two pinions 111 and 112 are quite similar. A cam plate 121 (Figs. 1, 3 and 14) is mounted on a pair of links 122 and 123 by pivotal connections 124 and 126 respectively. The link 122 at its lower end is journaled on a rod 127 which extends transversely of the machine and is held between an angle strut 128 and a strap 129 which is struck up from the material of the angle strut 128. Comparably, the link 123 adjacent its lower end is journaled on a rod 131 which extends transversely of the machine and is held between an angle bar 132 held between the frame plates 8 and 9 and a strap 133 struck up from the material of the angle bar 132. This method of mounting permits a motion of the plate 121 which is virtually a translation in a longitudinal direction.

In order that the plate 121 may likewise be guided from the lateral aspect and in a rectilinear path, I arrange that the cross plate 94 (Figs. 1 and 14) is cut with suitable slots 136, while a comparable plate 137 arranged adjacent the other end of the cam plate 121 is likewise along its upper edge cut with suitable slots 138. Furthermore, in order that the plate 121 will be urged toward one extreme position, I preferably extend the link 123 to provide a hook 139 on which is fastened one end of a coil spring 141, the other end of which is connected to a bracket 142 running transversely of the machine and held between the frame plates 8 and 9.

In this described fashion the cam plate 121 (Fig. 1) is confined to substantially a rectilinear path of travel and is urged in a direction by the spring 141 such that an extension 143 which at its extremity is looped to lie within the groove 117, is effective to translate the pinion 112 axially of the shaft 106 and out of the path of rotation of the tooth series 99 on the actuator 97. Movement of the cam plate 121 against the urgency of the spring 141, however, is effective to translate the pinion 112 on the shaft 106 into the path of the tooth series 99. The amount of translation of the pinion 112 is determinative of the number of teeth on the actuator which will be effective to gear with the teeth of the pinion and, consequently, is determinative of the amount of polar or angular rotation of the shaft 106 for each rotation of the actuator 97.

That is to say, if the pinion 112 is in the position shown in Fig. 1C, none of the teeth in the series 99 is effective upon the pinion 112, and the shaft 106 is not rotated by any of the teeth of the series 99. However, if the pinion 112 is axially translated to lie within the path of the longest teeth of the series 99, then, since there are six equally long teeth, six of the teeth of the pinion 112 are engaged thereby and the shaft 106 is rotated six units for the ten units making up one complete rotation of the shaft 93. Correspondingly, if the pinion 112 is moved to engage the next shorter teeth, of which there are seven in the series 99, then the shaft 106 is rotated seven-tenths of a rotation for each complete rotation of the shaft 93. Correspondingly, if the pinion 112 is moved to mesh with the shortest teeth of the series 99, then, since there are nine of such teeth, the pinion 112 will be rotated through nine-tenths of a complete rotation for each rotation of the actuator 92.

A quite similar mechanism is effective upon the pinion 111. That is, if this pinion is moved axially into the position shown in Fig. 1C, it meshes with none of the teeth on the actuator 97. However, if the pinion 111 is translated to mesh with the longest tooth of the series 97, then, since there is but one such tooth, the pinion 111 rotates the shaft 106 for but one-tenth of a rotation for each complete rotation of the actuator 97. Correspondingly, the shaft 106 is rotated through increasing increments as the length of the teeth in the series 98 decreases, until finally, if the pinion 111 should be axially translated to lie in the path of the shortest teeth in the series 98, then, since there are five of such teeth, the pinion 111 will be meshed therewith to rotate through five-tenths of a complete rotation for each single rotation of the actuator 97.

The pinion 111 (Figs. 1 and 14) is axially translated by means of an extension 151 which is hooked to lie within the groove 146 and is part of a cam plate 152 mounted by links entirely comparable to the described links 122 and 123 and guided between the plates 137 and 94. The difference between the cam plates 121 and 152 is simply that the cam plate 121 is provided with four cam contours 153, 154, 155 and 156, each of a different and progressively increasing slope, while the cam plate 152 is provided with five cam contours 157, 158, 159, 160 and 161, each one of a progressively increasing slope.

Keyboard

The cam plates 121 and 152 (Figs. 1 and 3) of each pair which is provided in the keyboard or selector mechanism for each order, are arranged to lie on opposite sides of the plane of a series or bank of keys, generally designated 166, which project through the upper portion of the machine (Fig. 1A) for convenient manual operation. The keys are all virtually identical, so that a description of one will serve as an example of all. Each key 167 (Figs. 1, 1C and 3), for example, is a relatively flat plate which intermediate its ends is provided with a pair of elongated slots 168 and 169. The slots ride over transverse through-rods 171 and 172 respectively, which are carried for each bank of keys by a pair of spacing channels 173 and 174. The pairs of channels in turn at their opposite ends are carried in perforated master plates 176 and 177 which are suitably flanged and secured to the end plates 8 and 9 of the machine. Each key 167 at its upper end is provided with a finger cap 179, so that the key can be suitably translated on the rods 171 and 172.

Although the key can be digitally depressed, it must be returned to elevated position by a spring, which, in the present case, is for each bank of keys a sinuously arranged coil spring 182 anchored at opposite ends in the plates 176 and 177, and between its ends passing over the successive rods 171, and between such rods passing under a pin 183 projecting laterally from an ear 184 forming part of the key 167. Depression of the key 167 and, correspondingly, of the pin 183 causes the spring 182 between successive ones of the rods 171 to elongate, so that when the key 167 is released the force of the spring tending to contract or straighten itself causes the key to return to uppermost position, as indicated in Fig. 1.

The keys which represent the numerals from "1" to "5," at their lower ends carry transverse pins 186 which project in a direction to co-operate with the cam faces 157 to 161, inclusive, of the cam plate 152. For instance, depression of the key 167, representing the numeral "1," is effective to cause the pin 186 of such key to ride over the cam face 157 and approximately to translate the cam plate 152 a single unit amount, thus pulling the pinion 111 into the path of the single, longest tooth of series 98 on the actuator 97. Thus, when the actuator rotates through a single cycle, the longest tooth of the series 98 will gear with the teeth of the pinion 111 and will cause one-tenth of a rotation of the shaft 106 for the complete cycle of rotation of the actuator 97. Correspondingly, the key representing the number "2" has a pin 186 at its lower end which meshes with the cam face 158. The inclination of this cam face is such that when the key representing the numeral "2" is depressed the cam plate 152 is translated through two units of motion, thus causing the two-tenths position of the pinion 111 to be assumed. The same considerations apply to the key representing the numeral "3" which moves the cam plate 152 through three units, for the key representing the numeral "4" which moves the cam plate 152 through four units of motion, and for the key representing the numeral "5" which in engaging the cam face 161 moves the cam plate 152 through five units of motion.

Similarly, the key representing the numeral "6," when depressed, engages the cam face 153 to translate the cam plate 121 and to move axially the pinion 112 into the path of the longest teeth of the series 99, which produces six-tenths of a rotation of the shaft 106 for each rotation of the actuator 97. Correspondingly, the key representing the numeral "7" engages the cam face 154 on the cam plate 121 and causes translation of the pinion 112 into that portion of the path of the series 99 which will produce an appropriate rotation of the shaft 106.

In the same fashion the key representing the numeral "8" when it engages the cam face 155, and the key representing the numeral "9" when it engages the cam face 156, are effective to produce a proportionate number of unit translations of the cam plate 121 and produce an appropriate and corresponding orientation of the pinion 112.

In order that each of the keys 167 will be held in its depressed position, I provide each of the keys 167 (Figs. 1 and 3) with a suitable notch 201 which, when the key is fully depressed, is adapted to be entered by a sliding plate 202 extending along the bank of keys and having therein a plurality of apertures 203, one for each of the keys of the bank. The plate 202 at opposite ends is carried by the strips 176 and 177, but projects as at 204 from the strip 177 and is bent to form a seat for a coil spring 206 which likewise abuts the member 177. The plate 202 is therefore urged into a position in which it will interengage with the notch 201 to lock in position the particular key of the bank or order which is depressed. Movement of the plate to the right in Fig. 1, however, releases the depressed key. In order to move the plate to releasing position against the urgency of the spring 206, each of the keys is likewise provided with a notch 207 having an inclined upper boundary, so that the initial movement of the key toward depressed position first moves the plate 202 to key-releasing position so that any key which prior thereto has been latched in depressed position will be released.

The key 167 (Fig. 1) of each bank which represents the numeral "0" is in the main like the remaining keys in that it is translated on rods 171 and 172. However, instead of engaging the spring 182 it is provided with an extension 211 which engages a coil spring 212 mounted on a projection 213 on the plate 177. This spring normally urges the key upwardly. Furthermore, this key is not provided with any means for locking it or holding it in depressed position, and on the other hand is provided with an exaggerated inclined surface 214 for moving the plate 202 to releasing position. Thus, as a matter of fact, the key 187 representing the numeral "0" acts as a clear key for its own bank or order.

With the selector or keyboard described it is possible, therefore, to so orient the pinions 111 and 112 that the shafts 106 will be rotated an amount equivalent to any particular number or value desired to be introduced into the several orders.

Plus-minus mechanism

In order that the numeral wheel 234 (Fig. 1) will indicate an appropriate and corresponding rotation of the shaft 106, I provide on the shaft 106, between the cross plates 109 and 107, a shiftable spool 261 at one end carrying a ten-tooth gear 262 and at the other end carrying a ten-tooth gear 263. In the neutral position shown in Fig. 1, neither of these gears is in mesh with a ten-tooth gear 264 which is fast on the numeral wheel shaft 233. On the other hand, when the spool 261 is shifted to the right, as seen in Fig. 1, the gears 262 and 264 are in mesh, while when the spool 261 is shifted to the left, as seen in Fig. 1, the gears 263 and 264 are in mesh. By this arrangement the shaft 233 can be connected to the shaft 106 to partake always of a movement which is proportionate thereto but the direction of which is dependent upon which of the gears 262 or 263 is utilized. Thus, while the shaft 106 always operates in a predetermined direction and never reverses, nevertheless the shaft 233 can be rotated either in a positive or additive direction, or, alternatively, in a negative or subtractive direction.

Accumulator

The machine of my invention includes a carriage 226 (Figs. 1, 1A, 1C, 4 and 8) containing a register or accumulator, generally designated 227, the individual orders of which can be aligned with the desired individual orders of the selector and actuator mechanisms by translation of the carriage transversely of the machine. The carriage is provided with runners 228 and 229, respectively, the latter of which engages with a suitable track 231 forming part of the framework of the machine, and the former of which runs on an extension of the transverse plate 107. Within the carriage, which is essentially a hollow casing, there is provided a main support 232 (Figs. 1 and 2) which extends transversely of the carriage and at suitable intervals carries a plurality of numeral wheel shafts 233. Since each of the numeral wheel shafts is identical with its fellows, but one need be detailed for descriptive purposes.

The shaft 233 (Figs. 1, 1C and 2) is journaled between its ends not only in the support 232 but likewise in the carriage frame 226, and carries at its upper end a generally conical numeral wheel 234 the individual numerals of which, from "0" to "9," inclusive, are individually observable through an inspection aperture 236 (Fig. 1A) in the carriage shell. A guide bar 237 (Figs. 1C and 2) mounted exteriorly of the carriage carries slides 238 which can be arranged as desired to demark groups of the apertures 236. In order that the individual ones of the numerals on the wheels 234 will be properly aligned with the viewing aperture 236, I preferably mount adjacent the support 232 a strip 241 which is pierced concentrically with the shaft 233 with a star-shaped aperture 242 providing ten successive depressions. Projecting from the shaft 233 is a spring-pressed ball 243 adapted to ride in the successive depressions 242. Since these depressions are aligned with the respective numerals on the wheel 234, the shaft 233 is resiliently urged to centralize itself in any one of ten positions, but in each of such positions one of the numerals on the wheel 234 is in precise alignment with the viewing aperture 236.

Accumulator zero resetting mechanism

Since, during the operation of the machine, the numeral wheels 234 are left in variously oriented positions, and since it is further desirable to return each of these wheels to a given initial or zero position, I provide a clearing means for rotating the individual shafts 233 a sufficient amount to restore simultaneously all of the numeral wheels 234 to zero position. Each of the shafts carries for this purpose a mutilated pinion 244 (Figs. 1, 1C and 2). This was originally a ten-tooth pinion but it has had one tooth removed to make it a nine-tooth pinion with an interrupted zone. In order to conserve space, alternate ones of the shafts 233 have the pinions 244 located at different axial positions thereon.

The alternate pinions 244 all mesh with a multi-sectional rack 246 which is constrained to move in a rectilinear path by a pair of projecting screws 247 operating in elongated slots 248 in the support 232. At intervals equal to the distance between alternate ones of the wheels 244, the rack is cut away, as at 249, to provide individual racks, each of which is normally out of mesh with the adjacent one of the pinions 244. The intermediate pinions 244 are comparably arranged for engagement with the rack 246 but are normally adjacent cut-away portions 251 which are spaced apart a distance equal to the space between the alternate pinions 244. Thus, the individual racks formed by cut-away portions 251, and also those formed by cut-away portions 249, are of greater length than the ordinal spacing of shafts 233 and successive individual racks are offset to be disposed in longitudinal overlapping relation. This structure enables reduced width of the machine. Thus, when the rack 246 is in the position shown in Fig. 2, each of the shafts 233 is free to rotate. However, when the rack 246 is translated, say, toward the right in Fig. 2 by means of a knob 252 which projects from the casing 226, then the rack teeth engage with the teeth of the interrupted gears 244 and rotate each of the gears, if they are already out of zero position, a sufficient amount until the interruptions are in the position shown in Fig. 2 in which the numeral wheels 234 are in zero position and the entire register is clear. The rack 246 is returned to the position shown in Fig. 2 by means of a suitable spring (not shown). The return movement is ineffective upon the shafts 233 inasmuch as there is no intermeshing between the rack and the pinions when the pinions are in zero position. The shafts 233 are therefore easily restorable to zero upon manipulation of the handle 252, and are properly centralized in any position by the members 243.

Accumulator tens transfer mechanism

But, for either direction of rotation of a shaft 233, for each complete rotation thereof the corresponding shaft 233 of the next higher order should partake of one-tenth of a complete rotation in the same sense. In other words, a tens-carrying mechanism between the successive shafts 233 must be provided.

To this end the shaft 233, between the ten-tooth gear 264 and the lower leg of the support 232, carries, particularly as shown in Fig. 2, a one-tooth gear 266. Journaled in the lower leg of the support 232 as well as in a strap 267 mounted parallel thereto, is a shaft 268 (Figs. 2 and 22) which carries a bell crank 269. One arm 271 of the bell crank carries a single tooth 272, while the other arm 273 carries a projecting pin 274 which extends laterally into the region of the next successive order. Thus, for a single rotation of the shaft 233 the one-tooth gear 266 operates the bell crank 269 a single time. When the teeth 266 and 272 are not in opposition the pin 274 is retracted, as shown in Figs. 1 and 2. However, when these teeth come into opposition at the tens-carrying position of the shaft 233, the pin 274 is projected and translates a quill 276 (Figs. 1, 14 and 22) which is slidable on the squared shaft 106.

The quill at one end carries a disc 277 which runs between a fork 278 forming part of a slide 279 working in suitable slots in the members 96 and 107. The slide 279 at its opposite end is provided with a pair of notches 281 (Fig. 1C) and 282 respectively, either of which is adapted to seat on a through-rod 283 extending transversely of the machine and carried in a bracket 284 projecting from the plate 107. A coil spring 286 at one end is in engagement with the slide 279 and at the other end is hooked to a projection 287 on the plate 107. The slide 279 is held by the spring 286 with one or the other of the notches 281 or 282 in engagement with the rod 283 which therefore acts as a centralizer for either of the two extreme positions of the slide 279.

When, therefore, the pin 274 is projected, due to the initiation of a tens-carrying operation, the disc 277 is translated toward the left in Fig. 1 and moves the slide 279 with it. The disc assumes its other extreme position, being centralized therein since the notch 282 is in engagement with the rod 283. The quill 276, in addition to the disc 277, carries a ten-tooth gear 288 (Figs. 1, 1C and 22) which, when the quill is translated, to the left in Fig. 1, on the shaft 106, moves into the path of a single-tooth gear or actuator 289 on the actuator shaft 93 located between the members 109 and 96. Since the lever arm 273 extends from the lower order toward the higher order, the tens-carrying actuator 289 on the shaft 93 is effective to rotate the shaft 106 through one-tenth of a rotation to complete the tens-carrying operation in the next higher order.

Since the tens-carrying actuator 289 is power driven, it is desirable to have a centralizing mechanism on the shaft 106 which will be effective to hold the shaft 106 centralized, not only after rotation thereof by the actuator 97 but also after rotation thereof by the tens-carrying actuator 289. For this reason, there is mounted on the shaft 106 a Geneva wheel 291 (Figs. 1, 14 and 20) having ten concave faces. These faces can each mate with a disc 292 mounted on the shaft 93. The disc 292 has a cut-away portion 293 (Fig. 20) and a notch 294. When the cutaway portion 293 is adjacent the Geneva wheel 291, the shaft 106 is free to rotate, except for the centralizing action of a star-wheel 296 (Figs. 1 and 14) against which operates a detent lever 297. All of the detent levers 297 are urged into position by a sinuous spring 298 threaded between successive pairs of pins 299 and 300. The shaft 106 can rotate under the superior urgency of the actuator 97, but at the conclusion of such intergeared rotation the Geneva wheel 291 is again held in position by the disc 292 which appropriately rotated along with the actuator shaft 93. But in addition to freeing the shaft 106 when it is to be rotated by the actuator 97, the disc is so oriented that the notch 294 comes into juxtaposition with the Geneva wheel 291 at an appropriate time to permit the actuation of the shaft 106 by the tens-carrying actuator 289.

Means for restoring the tens-carrying mechanism to its inactive position include a single-tooth actuator 289 (Figs. 1 and 22) provided with an axially cammed extension 301 which, as soon as the ten-tooth gear 288 has been advanced one-tenth of a rotation and the single-tooth actuator 289 has come out of mesh therewith, is effective against the projected end of the slide 279. Rotation of the axial cam 301 not only translates the slide 279 back to its original position in which the notch 281 is then in engagement with the rod 283, but likewise, through the fork 278, moves the disc 277 and correspondingly the quill 276 back to the position shown in Fig. 1. This movement of the quill, since the disc 277 bears against the pin 274, moves the bell crank 269 back to its original location.

Revolutions counter mechanism

Mounted on the carriage 226, in addition to the accumulator, is a revolutions counter, generally designated 306 (Fig. 1). This register comprises a plurality of shafts 307 journaled at opposite ends in extensions 308 and 309 of the carriage frame 226. The spacing of the shafts 307 is the same as the spacing of the successive orders in the multiple register. Each of these shafts 307 carries a numeral wheel 311 bearing numerals from "0" to "9" inclusive, spaced apart on the periphery of the wheel and adapted to be seen through a reading aperture 312 cut in the upper face of the carriage shell 226.

The individual numbers of the wheel 311 are properly centralized in line with the aperture 312 by a centralizing mechanism 313 similar to aperture 242 and ball 243, shown in Fig. 2. Also, the shafts 307 are alternately provided with axially offset clearing gears 314 meshing with a multi-sectional clearing rack 316 in exactly the same fashion as the rack 246 and the gears 244. The rack 316, however, is operated against the urgency of a suitable spring (not shown) by means of a knob 318 projecting from the upper face of the carriage. The revolutions counter is therefore provided with a plurality of numeral wheels 311 arranged in spaced relationship and in any desired number for the capacity of the machine. The individual wheels of this register are all properly centralized and can simultaneously be restored to zero or cleared position by operation of the knob 318 (Fig. 1A). Furthermore, one or more markers 319 slidably mounted on a strap 320 are available for demarking groups of the numeral wheels 311.

In order suitably to actuate or introduce values into the revolutions counter there is provided a suitable actuator. The actuator includes a member 321 (Figs. 1C, 18, 23 and 24) which has a compound motion having two major components, one a translatory reciprocation and the other a rotary oscillation. That is, the member or shaft 321 is mounted in the plates 8 and 9 to move from end to end and to be rocked back and forth. Mounted on the shaft is a pair of collars 322 each of which is extended to support a pair of parallel rods 323 and 324. Disposed on the shaft 321 between the rods 323 and 324 is a plurality of actuator spools 326 which in general are identical and are of such size as to be spaced with the same spacing as the shafts 307, all of the spools except the right hand one in Fig. 18 being operative for transfer actuation only, while the right hand spool 326 carries the counting actuator. The right hand spool 326 as viewed in Fig. 18 is only partially complete as compared with the other spools, and carries a finger 327 which projects radially between a ten-tooth gear 328 (Fig. 1) and a single-notch disc 329 (Figs. 1C and 24) both on the shaft 307.

Forming part of the finger 327 is an eyelet 331 to which is hooked a spring 332, the other end of which is hooked on the rod 323. Thus, the spring 332 urges the finger 327 to rotate clockwise, as seen in Figs. 1 and 1C, about the shaft 321. Such movement of the finger, however, is restrained by a projection 333 likewise forming part of the spool 326 and engaging with the shaft 324. As particularly seen in Figs. 1 and 1C, therefore, as the shaft 321 rotates or oscillates clockwise, carrying with it the frame rods 323 and 324, under the urgency of the spring 332 the finger 327 is moved to introduce itself between successive teeth on the gear 328. At this juncture the rotary oscillation of the shaft 321 is interrupted and the shaft is translated axially toward the right, as seen in Fig. 18, for instance. Such movement, since the finger 327 remains intermediate successive teeth on the ten-tooth gear 328, is effective to rotate the shaft 307 for one-tenth of a complete revolution, and thus to advance the numeral wheel 311 for one successive digit.

At the conclusion of such axial movement toward the right, as seen in Fig. 18, for instance, the shaft 321 again oscillates, but this time in an anti-clockwise direction, so that the finger 327 is rotated positively, due to the contact of the shaft 324 against the finger 333, into the position as seen in Figs. 1 and 1C in which the finger is out of mesh with the pinion 328. The return axial movement of the shaft 321 toward the left, as seen in Fig. 18, therefore, restores the parts to their original position. By the described operation, the numeral wheel 311 is advanced one unit, with the numerals properly aligned with the inspection aperture by the centralizing mechanism 313.

It is especially pointed out that if, when the shaft 321 initially rotates to mesh the finger 327 with the ten-tooth gear 328, such meshing movement is followed by an axial translation of the shaft 321 toward the right, for instance, in Fig. 18, then the numeral wheel is advanced in a positive direction. On the other hand, if, following the initial meshing movement of the finger 327 with the gear 328, the axial translation of the shaft 321 is toward the left, as seen in Fig. 18, then the direction of movement of the shaft 307 and the numeral wheel 311 is subtractive or negative.

*Tens transfer mechanism for the revolutions counter*

Now, for each complete rotation of a lower order numeral wheel 311 of the revolutions counter, the numeral wheel of the next higher order must be advanced one-tenth of a rotation. To this end the spool 326 which is arranged intermediate the lowest order and the next higher order, as seen in Fig. 18, is not only provided at its left-hand end with a finger 327, but is also provided at its right-hand end with a finger 336 which is bent to be co-planar with finger 327 of lowest order and carries a projection 337 so that the parts are in contact when they bear the relationship illustrated in Figs. 1C and 23. Thus, the spring 332 of the "tens" order, for instance, as seen in Fig. 18, is effective to urge the finger 336, and particularly its projection 337, into contact with the finger 327 of the "units" order. However, the spool 326 of the "units" order cannot yield because its projection 333 is in contact with the shaft 324. When, however, the shaft 324 rotates about the axis of the shaft 321, the finger 336, under the urgency of its spring 332, tends to follow the finger 327, but can only do so when the notch (Fig. 24) in the disc 329 of the units order is in position therefor, which only occurs when the units order counter numeral wheel passes from "9" to "0" and vice versa.

If the notch is out of passing position, i. e. when no tens carry has been determined by the units order counter numeral wheel, the finger 336 cannot pass by the barrier of the disc, then the spool 326 cannot rotate about the axis of the shaft 321 and finger 327 of the tens order is held in inactive position. Correspondingly due to the similar interlocking relationship of the remainder of the spools 326 for the higher orders, all such higher order spools are maintained stationary. But on the other hand, if the tens-carrying notch in the disc 329 of the units order, for example, is in position to permit passage of the finger 336 associated therewith, then such finger rotates along with the finger 327 of the units order and causes a corresponding rotation of the spool 326, and the finger 327 of the tens order is effective on the gear 314 and the shaft 307 of the next higher or tens order in the revolutions counter to rotate such shaft through one-tenth of a rotation and thereby effect the tens-carrying operation.

*Operation of revolutions counter actuator*

The rotary oscillation of the shaft 321 is produced in synchronism with the rotation of the shaft 83. At the end of the shaft 83 which projects through the frame plate 8 there is mounted an eccentric 341 (Fig. 13) against which bears a follower 342 projecting from one arm 343 of a bell crank generally designated 344 and pivoted as at 346 on the plate 8. A coil spring 347 is anchored to the plate 8 at one end by a pin 348 and at the other end is connected to a pin 349 on the arm 343. The bell crank is likewise provided with an arm 351 which is forked to engage a pin 352 on a crank 353 mounted on the opposite side of the plate 8 and fastened on the shaft 321. The pin 352 projects through an aperture 354. Thus, for each complete rotation of the shaft 83 the bell crank 344 is oscillated about the pivot 346 and through the crank 353 causes a comparable complete oscillation of the shaft 321. The timing of the rotary oscillation provides for engagement of the actuator finger 327 with the associated gear 328 by the first half or phase of such rotary oscillation which occurs during the first part of the cycle, then a dwell occurs in such rotary oscillation while the engagement of the finger and gear is maintained to allow the first half or phase of the axial translation to cause movement of the gear for one tooth space. Subsequently the finger is disengaged from the gear by the second half or phase of the rotary oscillation, the disengagement being effected before the end of the cycle to allow the second half or phase of the axial translation to return the actuator finger to its starting position.

The longitudinal or axial translation of the shaft 321 is provided by a mechanism especially illustrated in Figs. 6 and 7. On the shaft 83 is mounted a cam drum 356 having a pair of grooves 357 and 358 cut therein. These cam grooves are of identical contour but are polarly or angularly spaced from each other. In order to change the phase relationship of the axial movement of the shaft 321 to the rotary movement thereof, I provide means for optionally engaging either of the grooves 357 and 358. To this end, on the frame plate 9 I provide a pair of projecting ears 361 and 362. These ears mount a cross-shaft 363 which is held in place by suitable pins 364 and on which is mounted a sleeve 366. The lower end of the sleeve is united to a lever arm 377 at the extremity of which is a follower pin 378. Likewise on the sleeve 366 is a lever arm 379 at the extremity of which is a follower pin 381 adapted to extend into the groove 357.

To hold the sleeve 366 in either desired extreme position, I likewise provide on the sleeve a groove 382 in which runs a shifting pin 383 projecting through an aperture 384 in the plate 9 and carried at the end of a lever 386 fast on a shaft 387. Thus, as the shaft 387 is rotated between its two extreme positions, the pin 383 shifts the sleeve 366 along the shaft 363. In this fashion, either the pin 378 is introduced into the groove 358 so that the sleeve 366 reciprocates in phase relationship with the characteristics of the groove 358, or, conversely, the sleeve 366 is shifted in the opposite direction or downwardly on the shaft 263 and the pin 381 is engaged in the groove 357 so that the sleeve in such circumstances partakes of the reciprocatory movement imparted by the cam groove 357.

The motion of the sleeve 366, which is a rotary oscillation, is transmitted by a lever arm 388 which is fixed to the sleeve and at its extremity is forked, particularly as shown in Figs. 6 and 18, to engage a radially depending pin 389 projecting from the collar 322 encompassing the shaft 321. If pin 378 is engaged with groove 358, the first half of the axial reciprocation, which occurs during the dwell in the rotary oscillation of actuator finger 327, moves the finger to the left as viewed from the front of the machine so that a negative registration is effected. After this first half of the axial reciprocation, a dwell occurs in such reciprocation to allow the second half or phase of the rotary oscillation which disengages finger 327 from the associated gear 328. After such disengagement, the second half or phase of the axial reciprocation returns finger 327 to its initial position which it reaches substantially at the end of the cycle. If pin 381 is engaged with groove 357, the first half or phase of the axial reciprocation is a movement of finger 327 to the right so that a positive registration is effected. Thus, as the main shaft 83 rotates it imparts to the shaft 321 an axial translation in either selected one of two different phase relationships with the driving shaft. The phase relationship which is selected in a particular instance controls the sign character of the registration on the numeral wheels 311 in the revolutions counter, as outlined hereinabove.

Plus and minus keys

The machine, for the various rules of calculation, is manually under the control of a plus key 401 (Figs. 1A, 8 and 12) and a minus key 402. These keys are identical in shape and each comprises a strip 403 (Fig. 8) projecting through a suitable aperture in the casing of the machine and at its upper end carrying a suitable finger button 404. The strip 403 between its ends is provided with a pair of elongated slots 406 which guide the key on a pair of headed pins 407 projecting from the control plate 54. Each strip is therefore guided in a rectilinear path. Adjacent the lower end, each key is provided with a projection 408 passing through a suitable aperture 409 in the control plate 54 and engaging with a coil spring 411 which at its opposite end is anchored to a pin 412 on the control plate for urging the respective key to its uppermost position.

Depression of the plus key 401, therefore, tensions the appropriate spring 411 and likewise causes depression of a pin 413 projecting from the key and adapted to contact with an inclined cam face 414 forming part of a slide 416 having elongated apertures 417 therein for allowing translatory movement of the slide on the supporting pins 407. The slide 416, as the key 401 is depressed, therefore moves correspondingly, being translated toward the left in Fig. 8. Between its ends the slide 416 is provided with an aperture 418 into which projects a pin 419 which passes through the control plate 54. The pin 419 is at one extremity of a lever 421 (Fig. 4) pivoted as at 422 on the frame plate 9, and in turn at its opposite extremity provided with a fork 423 to engage a pin 424 at the extremity of a lever 426. This latter lever is pivoted by a headed bolt 427 on the control plate 54 and at its opposite end carries a pin 428 which extends through an aperture in the frame plate 9 and abuts one of the resilient arms 429 of the master switch generally designated 431. This switch comprises, in addition to the arm 429, a resilient arm 432 which, with the arm 429, is suitably fastened to a pair of brackets 433 and connected to the conductors 44 and 45, respectively. Likewise carried by the resilient arms 429 and 432 are contact points 434 and 436, respectively.

Thus, when the slide 416 is translated toward the left, in Fig. 8, by the depression of the plus key 401, the pin 419 causes an oscillation of the lever 421 (Fig. 4) about the pivot 422. This, due to the connection between the fork 423 and the pin 424, causes a corresponding oscillation of the lever 426 about its pivot point 427. Thus, the pin 428 urges the resilient contact lever 429 into such a position that the contact 434 abuts the contact 436. The circuit is therefore closed through the electric motor 31 which is energized to drive the entrained mechanism.

Substantially simultaneously with the energization of the motor, the clutch lever 76 is actuated. For this purpose the slide 416 (Fig. 8) likewise carries an elongated aperture 437 into which projects the pin 82 (Fig. 4) which is mounted, as heretofore described, on the clutch-operating lever 76. Upon the depression of the plus key 401, therefore, not only is the motor energized but likewise the clutch lever 76 is rocked so that pawl 67 is engaged with the ratchet 66, so that the actuating mechanism is set into motion. The slide 416 is held by the cam 84 in clutch-engaging and contact-closing position for a complete rotation of the main shaft, at any time during which the plus key 401 can be released to return to its original position. On the other hand, the plus key 401 can be maintained depressed to cause as many cycles of operation of the machine as desired.

In addition to causing energization of the electric motor and corresponding rotation of the actuators, the depression of the plus key causes an intermeshing of the pinions 262 and 264. Thus, the plus key 401 (Fig. 8) carries a projecting pin 441 which is adapted to act against a cam face 442 on a plate 443. One end of the plate 443 is pivoted as at 444 to a supporting lever 446 in turn fastened on the control plate 54 by a pin 447. The other end of the plate 443, however, is connected by a pivot 448 (Figs. 8 and 4) to a lever 449 mounted on a shaft 451 passing through the frame plate 9. The shaft 451 extends transversely of the machine and, adjacent opposite extremities thereof, carries a pair of uprights 452 (Figs. 1, 1B, 1C and 7) at their upper ends supporting a cross-strap 453 which is situated between the pinions 262 and 263 and is adapted to bear against them whenever the shaft 451 is rotated.

Thus, when the plus key 401 is depressed, the pin 441 abuts the cam face 442 and translates the plate 443 toward the left, as seen in Fig. 8. This translation of the plate 443 causes, through the connection of the pin 448 with the lever 449, a rotation of the shaft 451. This in turn simultaneously rotates the uprights 452 and moves the strap 453 toward the rear of the machine. Such movement of the strap 453 is effective to move all of the spools 261 and to mesh the gears 262 of each order with the corresponding gears 264 of the accumulator. Movement of the strap 453 from neutral position is opposed by one of a pair of fingers 454 and 456 each of which is pivoted as at 457 and 458, respectively, to the frame plate 8. A central abutment 459 serves as a stop for the two levers 454 and 456 since the levers are urged thereagainst by a common coil spring 460 joined to the levers by suitable pins 461 and 462. The pins 461 and 462 are located at different distances from the pivotal points 457 and 458, in order, at least partially, to compensate for the gravital thrust of the actuating mechanism toward the left in Fig. 1. The spring 460 is of sufficient force to restore all of the spools 261 to neutral position at the conclusion of a cycle of operation, providing the plus key 401 is then in released position.

The plus key 401 can be held depressed for any number of cycles desired, but in the event it is released prior to the completion of a complete cycle there is provided mechanism for maintaining the spools 261 in shifted relationship until the completion of the cycle or the return of the machine to full-cycle position. At one extremity, the main shaft 83 (Fig. 13) carries a cam disc 463 having a cam flat thereon in what corresponds to the full-cycle location of the disc. Running on the cam 463 is a follower 464 formed integrally with one arm 465 of a lever generally designated 466, which lever is pivoted on a pin 467 on the plate 8. The lever 466 likewise has an arm 468 terminating in a single tooth 469. The follower 464 is urged into contact with the cam 463 by a coil spring 471 at one end hooked to a pin 472 on the frame plate 8 and at the other end hooked on a pin 473 projecting from the lever arm 468. When the machine is in full cycle position, therefore, the spring 471 is effective to hold the tooth 469 in one extreme position, while during the operation of the machine or at an intermediate cycle position the tooth 469 occupies its other extreme position.

To take advantage of this motion, the shaft 451 (Fig. 13) passes through the frame plate 8 and carries a depending segment 474 which is peripherally provided with a series of three notches 475, 476 and 477. When the shaft 451 is in neutral position—that is, with the spools 261 in such a location that the gears 264 are not engaged—the notch 476 receives the tooth 469 as soon as the shaft 83 begins a rotation from full-cycle position. If the machine is once energized, therefore, with the shaft 451 in neutral position, the machine is so held or locked in such position until the completion of that cycle. On the other hand, when the plus key 401 is depressed and the shaft 451 is rotated in an anticlockwise direction, as seen in Fig. 13, then the tooth 469 is received by the notch 475 when the cycle of operation commences. As soon as the machine returns to full-cycle position, however, the spring 471 retracts the lever 466 and the shaft 451 is free to return to its neutral position under the influence of the centralizing levers 454 and 456.

When the minus key 402 is depressed, a similar sequence of operations occurs. This key 402 carries a projection 478 (Fig. 8) designed to engage a cam face 479 on the slide 416 and to translate the slide toward the left, as seen in Fig. 8, with the same motion that is caused by depression of the plus key 401, to energize the electric motor and to engage the clutch. Furthermore, the minus key 402 is provided with a projection 481 which is designed to co-operate with a cam face 482 on the plate 443. Since the face 482 is opposite in inclination to the face 442, engagement of the pin 481 with such face is productive of a translation of the plate in an opposite direction, or toward the right, as seen in Fig. 8. Through the pin 448 such movement rocks the lever 449 and the shaft 451. This movement, however, is such as to move the strap 453 toward the front of the machine and to translate all of the spools 261 in such a direction that the pinions 263 mesh with the gears 264 of the register mechanism. Such movement of the strap 453 is of course against the urgency of the centralizing lever 456. A negative registration is provided in the accumulator when the gears 263 and 264 are in mesh. While these gears are being meshed, due to the rotation of the shaft 451, the segment 474 is rocked, so that upon the initiation of the cycle the tooth 469 forming part of the lever 466 is received by the notch 477 and the relationship of the parts is maintained until the conclusion of a cycle.

Keyboard clear key

When desired, the keyboard of the machine can be cleared throughout by the operation of a clear key 491 (Fig. 4) which projects from the upper face of the casing. The clear key is a strip 492, headed with a finger button 493, which is provided with elongated apertures 494 for translation of the strip on a pair of fastening studs 496 and 497, respectively. The clear key is provided with a projecting pin 498 adapted to engage one arm 499 of a bell crank generally designated 501 and pivoted on a pin 502 projecting from the plate 9.

The other arm 503 of the bell crank carries a pivot 504 to which is fastened a link 506 at its opposite extremity having an elongated slot 507 overlying a pin 508 projecting into the slot and extending through an arcuate aperture 509 in the plate 9. The pin 508 projects from an ear 511 forming part of a gate 512 (Figs. 1 and 4) which extends transversely of the machine and at opposite ends is provided with ears 513 which contain pins 514 extending into the frame plates 8 and 9 respectively, so that the gate can oscillate about the axis formed by the pivot pins 514.

When the clear key 491 is depressed, the projection 498 abutting the arm 499 causes the bell crank 501 to rock, so that the link 506 is translated and, through the pin 508, oscillates the gate 512 and moves it into displacing engagement with the downturned end 204 of the latch plates 202. All of the keys on the selector or keyboard mechanism are thereby immediately released. The springs 206 are effective not only to return the latch plates 202 but likewise, through the gate 512 and the link 506, to rotate the bell crank 501 and, through the pin 498, to restore the clear key 491 to its original, projected position.

Add key

There is provided a mechanism which can, if desired, be brought into play for clearing automatically the entire selector or keyboard at the end of each cycle of operation, which function is especially desirable during the use of the machine as an adding machine. For this purpose the shaft 83, as particularly shown in Figs. 6 and 7, adjacent its journal in the plate 9 is provided with a clearing cam 516 which has a lobe 517 effective at the conclusion of a cycle of operation upon a follower lever 518. The lever 518 is pivoted as at 519 and is urged into contact with the cam 516 by a spring 521 one end of which is held on the plate 9 by a pin 522 and the other end of which is connected by a pin 523 to the lever 518. The lever 518 is thus oscillated about the pivot 519 once for each rotation of the main shaft 83 and is connected by a pin 524 to a link 526 having a hooked extremity 527. Between its ends the link 526 is provided with an elongated aperture 528 which rides on a pin 529 projecting from an "add" key 531.

The add key comprises a strip having adjacent its lower end an elongated slot 532 (Fig. 4) encompassing a headed stud 533 projecting from the plate 9. A stop pin 534 forms a partial guide for the add key 531, since the key is held thereagainst by a coil spring 536 one end of which is connected to a pin 537 in the plate 9 and the other end of which is hooked to a pin 538. The add key is likewise provided with a notch 539, so that when the add key is completely depressed the notch is urged into engagement with the pin 534 by the spring 536. Such depression of the add key lowers the pivot pin 529 and permits the hook 527 to drop into engagement with a pin 541 projecting through an opening 542 in the plate 9 from its mounting at the lower extremity of the lever arm 503.

Thus, when the add key is raised, the clear key 491 can be operated to clear the selector manually. When the add key is depressed and hooked on the pin 534, the link 526 is in engagement through the pin 541 with the lever arm 503, and at the end of a rotation of the shaft 83 the rocking of the lever 518 translates the link 526 and oscillates the lever arm 503, so that the clear mechanism is actuated. The clear mechanism will continue to be actuated at the conclusion of each cycle of operation until such time as the add key 531 is manually operated to release the notch 539 from the pin 534 and permit the key to be projected to its initial position by the spring 536. This operation, of course, lifts the hook 527 and the link 526 from engagement with the pin 541 and disconnects the clear mechanism from the driving mechanism of the machine.

Carriage shift mechanism

In order that the carriage may be shifted by power during a division operation, I provide a suitable mechanism which is driven from an extended one of the actuator shafts 93, particularly as shown in Fig. 10. This shaft carries a pinion 661 which meshes with a gear 662 of twice its diameter. The gear 662 is carried on an axially movable sub-shaft 663 journaled in the plate 107 and in a suitable bracket 664. Freely mounted on the shaft 663 is a cam 666 (Figs. 9 and 10) which is part of a sleeve 667 one end of which is provided with end jaws 668 to form one member of a clutch. The other member of the clutch is formed by end teeth 669 projecting from the gear 662. A coil spring 671 urges the clutch members apart so that the ordinary rotation of the actuator shaft 93 is ineffective to rotate the cam 666.

But a shaft 641 of the division mechanism described hereinafter carries a cam 672 which can be rotated by appropriate means into contact with a pin 673 on a slide 674, and at the conclusion of such movement of the shaft 641 translates the slide on its supporting members, the shafts 641, 451 and a pin 676, towards the left as seen in Fig. 10. The slide 674 at one end is provided with a turned-over shoe 677 which bears against the end of the shaft 663, and when the slide 674 is translated the shoe forces the clutch members 669 to engage the clutch members 668 and cause a rotation of the cam 666. Since the pinion 661 is one-half the diameter of gear 662, two rotations of the actuator shaft 93 will produce one complete rotation of the cam 666.

The cam is ordinarily held in central position by a flat 678 (Figs. 9 and 10) on the sleeve 667 which cooperates with a lever 679 pivoted on a pin 681 and urged by a coil spring 682 into engagement with a flat 678. Rotation of the sleeve 667 rocks the lever 679 about its pin 681 and tensions the spring 682. Rotation of the cam 666 is effective upon a link 683 (Fig. 9), at one end provided with a cam follower button 684, and at the other end connected by a pivot pin 686 with an oscillating plate 688, being guided intermediate its ends by a pin 689 operating in an elongated slot 690. The plate 688 is pivotally mounted on a shaft 691 fastened to the plate 107, so that as the cam 666 makes a complete rotation the plate 688 can move through an oscillation away from and back to central position.

The plate 688 (Fig. 9) is urged into central position by a pair of springs 693 and 694, which at one end are hooked into an aperture 696 in the plate 688 and at the other end are connected to a pin 697 mounted on a slide bracket 698. The bracket is fastened to the plate 107, adjustable by a screw 699 passing through an elongated slot 701 therein. The slides 698 are guided by bent-over portions 702 engaging the edge of the plate 107, so that the tension of the springs 693 and 694 can be adjusted as desired. Movement in a clockwise direction, as seen in Fig. 9, of the oscillating plate 688 from its central position is first effective to cause a pin 703 to abut a latch plate 704 which is mounted on a locking lever 706 by a pivot pin 707. A coil spring 708 is fastened to the plate 704 and is also fastened to a similar plate 709 which is joined to the locking lever 706 by a pin 711. Bent-over lip 712 on the plate 709 and 713 on the plate 704 act as stops against the urgency of the spring 708.

Since the pin 703 (Fig. 9) contacts the plate 704 on the other side of the center of the pivot connection 707 from the stop 713, the motion of the pin 703 is imparted to the lock lever 706. This lever is at one end mounted on the plate 107 by a pivot 714 and at the other end carries a pin 716 which is ordinarily urged upwardly, in Fig. 9, by a coil spring 717 at one end connected to a pin 718 on the plate 107 and at the other end connected to a pin 719 formed on the lever 706. The pin 716 is therefore normally held between two successive teeth 721, a plurality of which are formed integrally with a hinge plate 722 mounted on a rod 723 extending longitudinally of the carriage and pivotally mounted in bracket 724 therein. The rod 723 is normally so that the teeth 721 engage the pin 716 by a torsion spring 726 one end of which is anchored in the bracket 724 and the other end of which is anchored to a collar 727 mounted fast on the shaft 723. An operating handle 728 at one end of the shaft 723 can be twisted against the urgency of the spring 726 to swing the plate 722 and the teeth 721 out of the path of the pin 716 so that the carriage can be shifted transversely of the machine by hand. However, with the normal position of the shaft 723 and the teeth 721, the carriage is held in position by the pin 716 interfitting between successive teeth. Thus, when the lever 706 is moved around the pivot 714 against the urgency of the spring 717 by operation of the pin 703, the pin 716 is withdrawn from between successive teeth 721, thereby freeing the carriage for transverse movement.

Further movement of the plate 688 (Fig. 9) causes a bell crank 731, which is mounted on the plate 688 by a pin 732, to come into contact with one of the teeth 721. The bell crank 731 is provided with a projecting pin 733 which abuts the boundary of an aperture 734 in the plate 688 under the urgency of a coil spring 736 which extends to a comparable bell crank 737 mounted on a pin 738 on the plate 688 and in its turn held in an extreme position by the coil spring with a pin 739 contacting the boundary of an aperture 741 in the plate 688. The oscillation of the plate 688 under the influence of the cam 666 is sufficient, after the bell crank 731 has contacted one of the teeth 721, to move the carriage one step toward the right, as seen in Fig. 9. At the conclusion of this movement of the carriage and the oscillation of the plate 688, the cam 666 has virtually completed its rotation. The follower 684 no longer follows the surface of the cam, and the plate 688, therefore, is promptly returned to neutral position under the urgency of the spring 694 which theretofore has been tensioned.

The return of the plate 688 (Fig. 9) from one extreme position to central position causes the bell crank 731 to ride under one of the teeth 721 of the plate 722 against the urgency of the coil spring 736, so that as the plate 688 returns to its neutral position the bell crank 731 assumes a new position intermediate the next succeeding two teeth of the series 721. Furthermore, the return of the pin 703 to neutral position permits the lever 706 to return under the urgency of the spring 717 to its upper position in which the pin 716 occupies a locking or centralizing position between the next succeeding teeth of the series 721, thereby holding the carriage in its translated position shifted one order from the previous position.

Although for automatic division, the only necessary movement of the carriage shifting plate 688 is from neutral position toward the right and return to neutral position, as seen in Fig. 9, I arrange the plate as described for movement of the carriage in either direction by manual means. The same general operations transpire when the plate 688 is shifted from central position toward the left and back, in Fig. 9, by virtue of a hand control, in order to shift the carriage toward the left, as seen in Fig. 9. Movement of the link 683 is not hampered, because the cam 666 is cut away to receive the follower 684 in the centralized position of the cam.

In order to impart such oscillation from the central position toward the right or the left, as seen in Fig. 9, by hand, the plate 688 is extended as shown in this figure and is provided on its lowermost extremity with a notch 742 with which, as seen in Fig. 7, a pin 743 is in engagement. This pin projects from the lower extremity of a bent lever 744 mounted on a shaft 746 carried in brackets 747 and 748. The shaft 746 is oscillatable in its brackets and at its lower extremity carries a lever 749 connected by a pin 750 to a lever 751 fastened on a shaft 754 projecting from the front of the machine casing and carrying thereon a hand-operating lever 756. Oscillation of the hand lever from neutral position in one direction produces a corresponding oscillation of the plate 688, therefore, from neutral position in the same direction, and shifts the carriage step by step in the direction indicated. On the other hand, shifting of the hand lever 756 from neutral position in the other direction causes a step-by-step shifting of the carriage in the opposite direction.

*Automatic division mechanism*

The calculating machine of my invention is designed to divide automatically. The automatic division mechanism includes operation programming mechanism in the form of a program control device for determining a predetermined sequence of machine operations during continuous and uninterrupted cyclic motion of the actuator, such operations including subtractive and additive registration on the numeral wheels and shifting of the numeral wheels from order to order. As explained later in greater detail, the intermittent operation of the program control device is in response to the registering movement of a numeral wheel during an overdraft registration. The overdraft control means is normally disabled with respect to the program control device, as is such device with respect to the other machine controls previously described. Both the overdraft control means and the program control device are enabled by manual control means. For this purpose there is provided a division lever 561 (Fig. 12) which is pivoted by a pin 562 on the control plate and projects through a suitable aperture 563 in the casing of the machine. The lower end 564 of the lever 561 abuts a pin 566 (Figs. 8 and 12) which passes through an aperture 567 cut in the control plate. The pin 566 is at one extremity of a slide 568 (Fig. 8) provided with a pair of elongated apertures 569 and 571 which guide the slide 568 on a pair of pins 572 and 573. A coil spring 574, at one end connected to a pin 576 projecting from the plate 54 and at the other end hooked to a pin 577 on the slide 568, draws the slide toward retracted position with the pin 566 in engagement with the lower end 564 of the lever 561.

Pivotal movement toward the left in Fig. 12 and toward the right in Fig. 8 of the division lever 561, translates the slide 568 toward the left, as seen in Fig. 8. This movement causes a pin 578 which abuts an extension 579 (Fig. 4) of the flexible contact arm 432, to urge the contact point 436 materially away from the contact 534, so that under no circumstances can the circuit be closed while the lever 561 is held by hand against the urgency of the spring 574. Translation of the slide 568 also translates a pin 581 carried at the extremity of the slide, which pin abuts a crank portion 582 of a lever 583. The lever is pivoted intermediate its ends on a pin 584 which connects it in turn to a lever 586 which itself is pivoted on a pin 587 in the plate 54. The lever 583 is therefore oscillated about the pivot pin 584, which oscillation is communicated to a link 588 by virtue of a pivotal connection 589 between the lever and the link.

The link 588 is also connected by a pivot pin 591 to the arm 592 of a lever mounted upon a pivot pin 593 on the plate 54. The lever is provided with another arm 594 carrying a pin 596 to which is hooked a coil spring 597, the other end of which is hooked to a stud 598 projecting from the plate 54. The arm 594 in its turn is adapted to abut a pin 599 projecting from the slide 416. Thus, upon oscillation of the lever 583 by virtue of translation of the slide 568, the link 588 is lowered, as seen in Fig. 8, and causes a rotation of the lever arm 594 about the pivot pin 593. Such rotation against the urgency of the spring 597 causes the lever arm 594 to abut the pin 599 and to translate the slide 416 just as though the plus key 401 were depressed. Translation of the slide 416 not only engages the clutch, as shown in Fig. 5, but likewise moves the contact 434 (Fig. 4) into abutting position.

It will be remembered, however, that the circuit cannot be closed at this juncture because the contact 436 is held out of its normal position by the pin 578. It is only when the lever 561 is released, which releasing movement permits the slide 568 to return to its original position and the pin 578 to restore the contact 436 to its normal position, that the circuit is closed for a division operation. However, the original movement of the lever 561, in addition to conditioning the clutch and the master switch for operation as soon as the lever 561 is released, likewise through the oscillation of the lever 583 around the pivot pin 584 oscillates the other arm 601 of the lever 583 in a clockwise direction, as seen in Fig. 8.

The extremity of the arm 601 (Fig. 8) is provided with a notch 602 having an inclined cam surface 603. The notch is adapted to engage a pin 604 projecting from one side of the slide 443. Since the axis of the pin 604 is offset with respect to the center of the notch 602, when the extremity 601 is lifted into engagement with the pin 604, the cam face 603 first strikes the pin 604 and translates the slide 443 to the right, as seen in Fig. 8, until such time as the pin 604 is centralized in the notch 602. The translation of the slide 443 is transmitted through the pin 448 to rotate the shaft 451 and engage or mesh the gears 263 with the pinions 264 for a negative or subtractive introduction of values into the accumulator. Thus, lever 583 forms connecting means from slide or plate 443 which controls the sign character of the registration on the numeral wheels and lever 586 which is associated with the program control device.

When the arm 601 is lifted into hooked relationship with the pin 604, a latch projection 606 on the side of the lever 601 rises from the position shown in Fig. 4 to an upper position in which it is held by a latch projection 607 on the lever arm 608. The lever 608 is pivoted on a pin 609 on the plate 9, and the opposite extremity thereof carries a pin 611 to which a spring 612 is connected. The other end of the spring is fastened to a pin 613. The latch 607, being urged by the spring 612, hooks under the projection 606 and maintains the pin 604 in the bottom of the notch 602 and, correspondingly, the slide 443 and the strap 453 in the subtractive position of the accumulator.

Thus, as soon as the automatic division lever 561 is released to return to its original position, the machine automaticaly goes through a cycle of subtractive operation. At the conclusion of a single cycle of operation, however, there is nothing to release the clutch or open the contacts to stop the machine at full-cycle position, and the actuators continue to operate, therefore, a number of times dependent upon the particular problem in the machine and, under any circumstances, until such time as an overthrow occurs at any selected one of the orders in the accumulator.

As shown particularly in Fig. 16, as soon as the tens-carrying slide 279 of the eleventh order (for example) is translated toward the left in the figure, in order to attempt to effect a tens-carrying operation, such movement of the slide 279 is effective to pivot a plate 616 (Figs. 1B and 16) about a pivot pin 617 fastened in a bracket 618 on the member 96. This is because of a projection 619 on the plate 616 which extends into a notch 621 cut in the slide 279 of the eleventh order. There is thus produced a rotation about the axis of the pivot pin 617. Such rotation likewise swings with the plate 616 a depending portion 622 to which is pivoted, by a pin 623, a lever 624. The lever carries an arcuate slot 626 fitting over a pin 627 projecting from the plate 622, and the lever 624 is urged into one extreme position by a coil spring 628 at one end connected to a pin 629 on the plate 622 and at the other end connected to a pin 631 on the lever 624.

When the lever 624 is urged into its full line position, as shown in Fig. 16, by the spring 628, its oscillation about the axis of the pivot 617 is ineffective upon the remainder of the mechanism, so that whenever the calculating machine is not set for a problem in automatic division the oscillation of the lever 624 laterally of the machine, due to the operation of the tens-carrying slide 279, is ineffective. However, when the machine is set for automatic division operation by displacement and release of the lever 561, the lever 583 when it pivots about the pin 584 is effective to condition the lever 624. To this end, on the lever 583, as shown in Fig. 8, there is provided a projecting pin 632 (also shown in Fig. 4) which rises as the lever 583 is set for an automatic division operation, and rotates in a clockwise direction, as seen in Fig. 4, a lever 633 which is mounted on a shaft 634 suitably suspended in the frame of the machine.

The shaft 634 extends transversely of the machine, being held by brackets 636 (Figs. 1B and 15), and carries a lever 637 the free end of which is provided with a pin 638. The pin 638 (shown particularly in Figs. 15 and 16) is effective when raised to lift the lever 624 against the urgency of the spring 628 into engagement with a collar 639 fast on a shaft 641 extending transversely of the machine and mounted for axial translation as well as rotation. Shaft 641 forms part of the program control device and has various control elements associated therewith as described hereinafter. Thus, when the machine is set for automatic division, the lever 624 is initially urged into engagement with the collar 639, so that upon the occurrence of an overdraft in the machine the eleventh order tens-carrying mechanism slide 279 moves to the left as viewed in Fig. 16 and is effective to oscillate the lever 624 about the pivotal axis 617 and to translate the shaft 641 axially toward the right hand side of the machine.

Now, as shown particularly in Figs. 6 and 12, the shaft 641, when translated axially, moves with it a mutilated pinion 642 which is fixed on the extreme end of the shaft. This mutilated pinion is provided with three groups of three teeth each. The pinion 642 normally is held in a position, shown in Fig. 12, by a lock pin 643 (Figs. 6 and 12) projecting axially from the gear and engaged with a suitable aperture 644 in a hardened button 646 mounted in the control plate 54. Thus, when the shaft 641 is shifted axially, the gear 642 is translated so that the pin 643 is lifted from the hole 644. Also, as the gear 642 is shifted it is moved into engagement with a Geneva wheel 647 provided with a generally smooth periphery but having at a suitable point teeth 648 for engagement with the teeth of the pinion 642 when the pinion is in shifted position. The Geneva wheel 647 is joined to an idler gear 649, meshing with a gear 651 of equal diameter which is mounted on the main shaft 83 and rotates in unison therewith.

Thus, when the overdraft in the eleventh order has occurred (about 50° before the end of the cycle) and the shaft 641 and the pinion 642 have been shifted for engagement with the Geneva wheel 647, the Geneva wheel promptly engages the pinion 642 and, owing to the relative tooth ratios thereof, rotates the pinion 642 and the shaft 641 through a third of a rotation. Geneva wheel 647 is shown in Fig. 12 in the position it occupies at the time of the overdraft a few degrees before the end of the overdraft cycle and just before the wheel rotates pinion 642 and shaft 641. The Geneva wheel and the pinion 642 are held in projected or engaged position by virtue of the fact that the pin 643 rides over the face of the hardened button 646 and, since there is a continuous face presented to the pin, the shaft cannot return to any other position. As the shaft 641 rotates for one-third of a revolution, it carries with it an eccentric 652 (Fig. 8) which is mounted on the shaft 641 and which engages in a yoke 653 formed in the lever 586. Since the initial position of the eccentric is as indicated by the line "A" in Fig. 8, and since the shaft 641 rotates through one-third of a revolution due to the action of the Geneva wheel 647 during the last part of the overdraft cycle, the eccentric shifts to position "B," as seen in Fig. 8. Such shifting of the eccentric moves the lever 586 and shifts the pivot 584. The link 588 at its lower end swings with the lever 583, but at its upper end simply pivots about the pin 591 and in no wise disturbs the lever 592.

However, since the latch 606 is still in engagement with the hook 608, the notch 602 being held in engagement with the pin 604, the translation of the lever 583 causes the slide 443 to shift toward the rear of the machine and correspondingly to move the strap 453 from its subtractive position through neutral position into its additive position, disengaging the pinions 263 from the gears 264 and engaging the pinions 262 with the gears 264. Therefore, during the first cycle after the overdraft cycle, the divisor will be registered positively in the accumulator to correct the overdraft. This operation of the actuators transpires while the Geneva wheel 647 is making a single rotation. During the last part of the correction cycle, the Geneva wheel causes the pinion 642 again to be rotated one-third of a revolution and correspondingly rotates the shaft 641. The eccentric 652 is consequently rotated from the position "B" as seen in Fig. 8 into the position "C" thereof. This position of the eccentric causes the lever 583 and the notch 602 to move the slide 443 back to an intermediate or neutral position with the strap 453 holding both the pinions 262 and 263 out of engagement with the gear 264.

Since the actuators are therefore disconnected from the accumulator, and since, due to the two-thirds rotation of the gear 642, the pin 643 has registered with and seated in a suitable aperture 656 (Fig. 12), the Geneva wheel 647 and the pinion 642 go out of engagement, and as many rotations as desired of the main shaft 83 can be utilized to effect a mechanical shifting of the carriage into the next order position for continuation of the automatic division operation.

As described in connection with the carriage shift mechanism, the shaft 641 carries cam 672 which is so disposed with respect to the mutilated pinion 642 that during the second one-third rotation of such pinion, the cam 672 engages pin 673 on slide 674 to move slide 674 to the left as seen in Fig. 10, whereby clutch members 669 are engaged with clutch members 668 to enable the drive for cam 666. Cam 666 is rotated once for each two revolutions of the associated actuator shaft 93 to effect shifting of the carriage for one ordinal step in the manner previously described.

But at the conclusion of the automatic shifting of the carriage toward the right, as seen in Fig. 9, during the automatic division operation, the cam 666 returns to its centralized position with the lever 679 maintaining such relationship, and the plate 688 is restored by the springs 693 and 694 to its central position after the carriage has been shifted. During the movement of the link 683 there is likewise oscillated a lever 757 (Figs. 9 and 15) which has one end projecting between forks 758 on the link 683 and which is pivoted as at 759 (Fig. 15) on a bracket 760 depending from the plate 96. The lever 757 has an arm 761 which abuts a collar 762 mounted on the shaft 641.

Since at the beginning of the carriage shifting operation the shaft 641 was translated back to its original position because the pin 643 dropped into the aperture 656, the initial portion of the movement of the link 683 to effect the shifting of the carriage is such as to oscillate the lever 757 so that the arm 761 thereof engages behind the collar 762, and at about the time the shift of the carriage is completed during the second cycle of shaft 83 in driving the shift mechanism, arm 761 moves collar 762 so that the shaft 641 is axially shifted again, whereby the pin 643 is withdrawn from the aperture 656 and the mutilated gear 642 (Fig. 6) is again meshed with the Geneva wheel 647. The overdraft which has occurred has been corrected and the carriage has been shifted to the next order, these operations occurring during the first three cycles or revolutions of shaft 83 following the overdraft cycle. The rotation of the Geneva wheel 647 during the second shifting cycle of shaft 83, therefore, is effective to produce another one-third rotation of the pinion 642 at the end of a third cycle after the overdraft cycle, thereby restoring the pinion to its original position in which the pin 643 again drops into the aperture 644.

During this last one-third rotation of pinion 642 and shaft 641, the eccentric 652 rotates from position "C," as seen in Fig. 8, back to position "A," during which time, the notch 602 being in engagement with the pin 604, the slide 443 is translated toward the right in Fig. 8, and the strap 453 causes the subtractive pinions 263 to mesh with the gears 264. The parts are thus restored to their original subtractive condition but in the next adjacent order. The subtractive operation of the machine continues in this particular order until such time as an overdraft occurs, at which time translation of the tens-carrying slide 279 (Fig. 16) in the eleventh order again sets into operation the sequence of events described hereinabove by which the continuous movement of the actuator is effective after the overdraft first to correct the overdraft by an additive operation, then to shift the carriage utilizing two rotations of the actuator for such purpose, and after the shifting of the carriage to restore the parts to condition for continuance of the subtractive operation which proceeds until a subsequent overdraft occurs in the next succeeding order to which the carriage has theretofore been shifted.

This sequence of operations repeats itself with a shift of the carriage following each corrected overdraft, until the capacity of the machine has been reached. When this occurs the carriage has been shifted as far to the right (Fig. 9) as possible. In this location of the carriage a cam plate 771, spanning successive teeth of the series 721, projects into the path of the bell crank 731, so that even though the plate 688 should be oscillated the bell crank 731 cannot engage between the successive teeth and cannot therefore be effective further to shift the carriage.

As the carriage shifts into its position for the final order of operation, a bracket 772 which depends from the carriage bears against the lever 608 (Figs. 4, 6 and 9) and translates the lever axially by urging the pivot pin 609, which is mounted in a sleeve 773 on the plate 9, against the urgency of a coil spring 774 which encompasses the pin 609. When the lever is so moved, a yieldable follower pin 776 is moved into the path of a cam 777 mounted on the shaft 641 for rotation therewith. The full line position of cam 777 corresponds to position "A" of eccentric 652, while the dotted line position corresponds to position "C" of the eccentric. Since the lever 608 is shifted at such time that the cam 777 is turned out of the position illustrated in dotted lines in Fig. 4 and has almost reached its full line position before the pin 776 is moved into the path of cam 777, the yieldable follower 776 simply butts against the face or side of the cam disc 777 and yields compressing the spring 778.

Shifting of the carriage into the last position is followed by one or more subtractive operations, producing an overdraft in the last order and subsequently a correcting additive cycle of operation. At the conclusion of this additive cycle cam 777 is turned to its dotted line position in Fig. 4, the follower 776 is urged by spring 778 into the notch 779 of the cam 777, as shown in Fig. 4, and the carriage shift drive is enabled by cam 672, eccentric 652 being in its position "C." However, the operation of the carriage shift mechanism is ineffective in the end position because, as explained above, cam plate 771 (Fig. 9) holds bellcrank 731 inactive. The next one-third rotation of the shaft 641 in the last part of the second shift cycle, which moves eccentric 652 from position "C" to position "A," is effective to rotate the cam 777 one-third of a rotation from its dotted line position in Fig. 4 to its full line position. This causes the cam face 789 to abut the follower 776 and to rock the lever 608 about the shaft 609. Such movement causes the latch 607 to ride out from under the latch pin 606. Thus, as the eccentric 652 returns to position "A" from position "C," it is no longer effective upon the slide 443 inasmuch as the release of the pin 606 permits the arm 601 to drop because of the urgency of the spring 592. The effect of the spring 597 is to rotate the lever 592 about the pin 593 in a clockwise direction, as seen in Fig. 8, which rotation is likewise effective to permit the slide 416 to move toward the right in this figure, and through the pins 419 and 82, to release the clutch and to open the electrical contacts 434 and 436, thus stopping the machine completely in full-cycle position at the conclusion of the automatic division operation.

*Revolutions counter control mechanism*

As previously described, values can be entered in the revolutions counter in either a positive or a negative sense despite the unidirectional movement of the actuating means therefor. There is provided under the control of the operator a means for manually selecting the sign character of a registration on the revolutions counter. This means takes the form of a lever 786 (Fig. 12) projecting from the top of the machine and mounted on a pin 787. The lever 786 is pivotally movable about the pin 787 between two positions, being retained in either position by a detent 788 which is pivoted as at 789 and is urged by a spring 791, fastened to a pin 792 on the detent and a pin 793 on the plate 54, into either of two notches 794 and 796 formed in the lever 786.

The lever is provided with an extended arm 797 which is bent into an axially sinuous and radially arcuate cam 798. This cam, while in one contour (Figs. 11 and 12) following the path of a radius about the pin 787, axially of the pin 787 is displaced with an inclined portion 799 leading to the displaced portion. The cam portions operate in a circumferential groove 801 on the shaft 387. Thus, as the handle 786 is moved from one extreme position with the detent 788 in the notch 794 to another position with the detent 788 in the notch 796, the shaft 387 is moved axially between two extreme positions. Due to the length of the pin 383, as seen in Fig. 75

11, such axial movement does not disturb the relationship of the sleeve 366, but since rotation of the shaft 387 does move the sleeve 366 there is mounted at the extremity of the shaft 387 a collar 802 (Figs. 11 and 12) which is provided with a pair of peripheral depressions 803 and 804 into which a detent lever 806 extends under the urgency of a spring 807 one end of which is connected to a pin 808 on the plate 54 and the other end of which is connected to a pin 809 on the detent which in turn pivots about a pin 811. The shaft 387 is therefore properly maintained in either of its extreme axial positions or centralized in either of its extreme rotated positions.

Between the collar 802 at one end of the shaft 387 and the lever 386 at the other end of the shaft, there is provided a mechanism which in its two different shifted positions provides either a positive or a negative registration on the revolutions counter. To this end the slide 443, particularly as shown in Figs. 8 and 11, carries a diamond-shaped frame 812 which is spaced from the slide 443 by a pair of posts 813 and pins 814. The frame is provided with a central aperture 816 which at opposite ends is formed to provide square notches 817 and 818 respectively. On the shaft 387 there is a crank 819 carrying a pin 821 which is adapted to interengage with the notch 817 when the shaft 387 is in one extreme axial position. Likewise carried by the shaft 387 is a comparable crank arm 822 which, however, is arranged on the shaft axially displaced from the crank arm 819 and at 180 degrees therefrom in an angular direction. The crank 822 carries a pin 823 which is adapted to interengage with the notch 818 when the shaft 387 is in its other extreme axial position.

By the operation of this mechanism, therefore, in the forward position of the setting lever 786, depression of the minus key 402, which translates the slide 443 to the right in Fig. 8, for instance, will cause a clockwise rotation of the shaft 387, for example, in the event the shaft is shifted so that the pin 821 is in engagement with the notch 817. This will cause a negative registration on the counter. If this relationship, due to the setting of the lever 786, is maintained when the plus key 401 is depressed, however, the slide 443 will then be translated toward the left in Fig. 8 and the shaft 387 will be turned in an anti-clockwise direction, giving a positive registration on the revolutions counter. On the other hand, if the lever 786 is positioned rearwardly as shown in Fig. 8 so that the pin 823 is in engagement with the notch 818, depression of the minus key 402 will still translate the slide 443 to the right in Fig. 8, which, however, instead of producing a clockwise rotation of the shaft 387, as before, will produce an anti-clockwise rotation thereof, so that a positive registration will be effected. Correspondingly, with this setting of the lever 786, depression of the plus key 401 will produce a translation toward the left in Fig. 8 of the slide 443, and will cause a clockwise rotation of the shaft 387, so that a negative registration will be effected. Thus, for either positive or negative registration on the accumulator values can be entered into the revolutions counter in either a positive or negative sense in accordance with the position of the lever 786.

I claim:

1. A calculating machine comprising a mechanism for effecting a machine operation, an electric motor for driving said mechanism, a control key mounted for initial movement to active position and for subsequent movement back to inactive position when released, means controlled by said key during said initial movement for conditioning said mechanism for said machine operation, circuit control means for said motor, and means controlled by said key to close the circuit for said motor after completion of said initial key movement and during said subsequent key movement.

2. In a calculating machine having a mechanism for effecting a machine operation, an electric motor for driving said mechanism, circuit control means for said motor including movably mounted opposed contact elements for closing the motor circuit, a control member normally operable upon initiation of a machine operation to determine engagement of said contact elements, a control key movable in one direction to operate said member, means for preventing engagement of said elements by said member during movement of said key in said one direction, and means for disabling said preventing means upon movement of said key in a second direction.

3. A calculating machine having mechanism for effecting a machine operation, an electric motor for driving said mechanism, a pair of movable normally spaced-apart contacts in the circuit of said motor, a control key for said mechanism mounted for movement away from and back to a normal inactive position, control means operated by said key upon movement away from said inactive position for moving one of said contacts toward the other, means for latching said control means in operated position, and other control means cooperatively related to said key for movement therewith for moving said other contact away from said one contact during movement of said key away from its inactive position and for returning said other contact to engage said one contact upon movement of said key back to said inactive position.

4. A calculating machine comprising a mechanism settable to effect a machine operation, an electric motor for driving said mechanism, and a control key mounted for movement to active position and back to inactive position when released, and means operated by said key upon movement to said active position to set said mechanism for said operation and to prevent operation of said motor, and means operative upon release of said key to cause energization of said motor.

CARL M. F. FRIDEN.